US008703362B2

(12) United States Patent
Blanchard et al.

(10) Patent No.: US 8,703,362 B2
(45) Date of Patent: Apr. 22, 2014

(54) MICROMACHINED ELECTROLYTE SHEET, FUEL CELL DEVICES UTILIZING SUCH, AND MICROMACHINING METHOD FOR MAKING FUEL CELL DEVICES

(75) Inventors: William Cortez Blanchard, Painted Post, NY (US); Sean Matthew Garner, Elmira, NY (US); Thomas Dale Ketcham, Big Flats, NY (US); Xinghua Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 159 days.

(21) Appl. No.: 13/451,973

(22) Filed: Apr. 20, 2012

(65) Prior Publication Data

US 2012/0243853 A1 Sep. 27, 2012

Related U.S. Application Data

(62) Division of application No. 11/978,430, filed on Oct. 29, 2007, now abandoned.

(60) Provisional application No. 60/995,209, filed on Sep. 25, 2007.

(51) Int. Cl.
*H01M 8/00* (2006.01)
*C03C 25/68* (2006.01)

(52) U.S. Cl.
USPC .............................................. 429/535; 216/94

(58) Field of Classification Search
USPC ........................................................ 216/94
See application file for complete search history.

(56) References Cited

U.S. PATENT DOCUMENTS

| 4,328,294 | A | 5/1982 | Tanaka et al. | |
|---|---|---|---|---|
| 4,853,100 | A | 8/1989 | Hsu | |
| 5,702,565 | A | 12/1997 | Wu et al. | |
| 5,705,565 | A | 1/1998 | Hughes et al. | |
| 6,270,601 | B1 | 8/2001 | Ritland et al. | |
| 6,440,597 | B1 | 8/2002 | Mizuno | |
| 6,582,845 | B2 | 6/2003 | Helfinstine et al. | |
| 6,623,881 | B2 * | 9/2003 | Badding et al. | 429/482 |
| 6,902,798 | B2 | 6/2005 | Ghosh et al. | |
| 7,045,237 | B2 | 5/2006 | Sridhar et al. | |
| 7,118,828 | B2 | 10/2006 | Dodd et al. | |
| 7,135,248 | B2 | 11/2006 | Finn et al. | |
| 7,144,651 | B2 | 12/2006 | Finn et al. | |
| 7,255,956 | B2 | 8/2007 | McElroy et al. | |
| 2002/0012825 | A1 | 1/2002 | Sasahara et al. | |
| 2002/0102450 | A1 * | 8/2002 | Badding et al. | 429/32 |
| 2003/0026697 | A1 * | 2/2003 | Subramanian et al. | 416/97 R |
| 2004/0104544 | A1 | 6/2004 | Fan et al. | |
| 2004/0219286 | A1 * | 11/2004 | Flanagan | 427/2.1 |
| 2004/0247253 | A1 * | 12/2004 | Durrant et al. | 385/76 |
| 2004/0265663 | A1 | 12/2004 | Badding et al. | |
| 2005/0048347 | A1 | 3/2005 | Takashita et al. | |
| 2005/0074650 | A1 * | 4/2005 | Sridhar et al. | 429/30 |
| 2005/0095482 | A1 | 5/2005 | Garner et al. | |
| 2005/0208354 | A1 * | 9/2005 | Hahn et al. | 429/30 |
| 2006/0029955 | A1 | 2/2006 | Guia et al. | |
| 2006/0030125 | A1 * | 2/2006 | Sackrison et al. | 438/460 |
| 2006/0105545 | A1 * | 5/2006 | Tseng et al. | 438/460 |
| 2006/0197264 | A1 | 9/2006 | Cutler et al. | |
| 2007/0117227 | A1 * | 5/2007 | Gu | 438/14 |

FOREIGN PATENT DOCUMENTS

| CN | 1646449 | 7/2005 |
|---|---|---|
| EP | 1063212 | 6/2000 |
| EP | 1401044 | 4/2003 |
| JP | 11067226 A | 3/1999 |
| WO | WO2008/054774 | 5/2008 |

OTHER PUBLICATIONS

Lumley, R.M., "Controlled Separation of Brittle Materials Using a Laser", American Ceramic Society Bulletin 1969; vol. 48, No. 9, pp. 850-854.
Tsai, Chwan-Huei et al., "Fracture Mechanism of Laser Cutting with Controlled Fracture"; Journal of Manufacturing Science and Engineering; Aug. 2003, vol. 125, p. 519-528.

* cited by examiner

*Primary Examiner* — Patrick Ryan
*Assistant Examiner* — Muhammad Siddiquee
(74) *Attorney, Agent, or Firm* — Svetlana Short

(57) ABSTRACT

A sintered electrolyte sheet comprising: a body of no more than 45 μm thick and laser machined features with at least one edge surface having at least 10% ablation. A method of micromachining the electrolyte sheet includes the steps of: (i) supporting a sintered electrolyte sheet; (ii) micromachining said sheet with a laser, wherein said laser has a wavelength of less than 2 μm, fluence of less than 200 Joules/$cm^2$, repetition rate (RR) of between 30 Hz and 1 MHz, and cutting speed of preferably over 30 mm/sec.

23 Claims, 25 Drawing Sheets

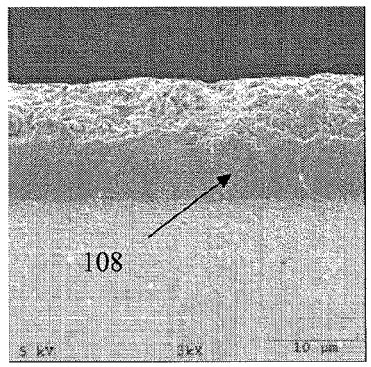 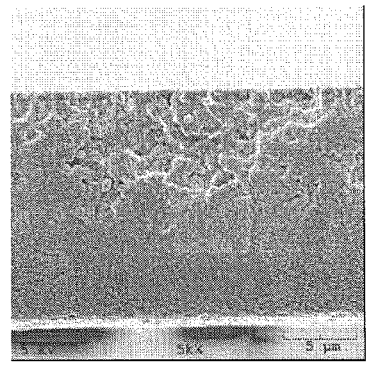
Figure 7a  Figure 7b
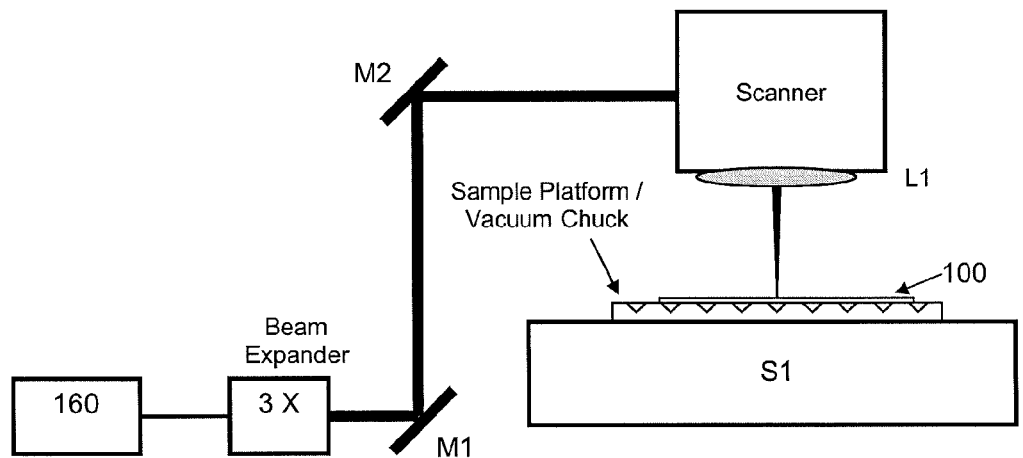
Figure 8

$N = 10 + 0/25$     $N = 10 + 1/25$     $N = 10 + 2/25$ $N = 10 + 3/25$     $N = 10 + 4/25$     $N = 10 + 5/25$

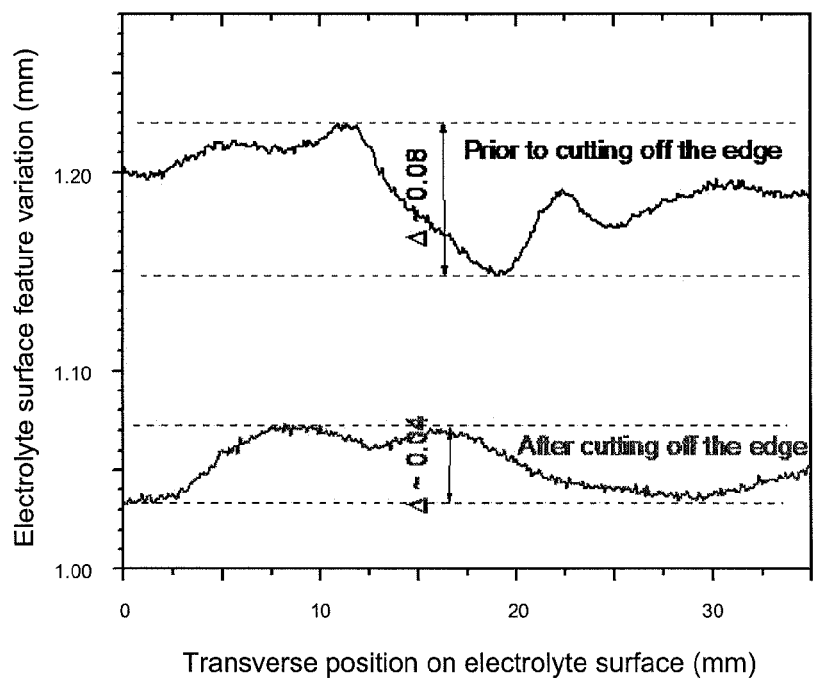
Figure 22
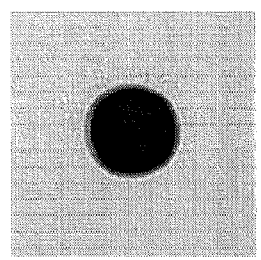
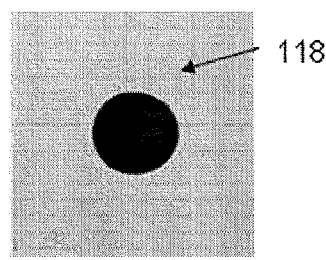
Figure 23a      Figure 23b

MICROMACHINED ELECTROLYTE SHEET, FUEL CELL DEVICES UTILIZING SUCH, AND MICROMACHINING METHOD FOR MAKING FUEL CELL DEVICES

RELATED APPLICATIONS

This application is a divisional of U.S. patent application Ser. No. 11/978,430, filed Oct. 29, 2007, which claims the benefit of U.S. Provisional Patent Application Ser. No. 60/995,209, filed Sep. 25, 2007.

BACKGROUND OF THE INVENTION

1. Field of the Invention

This invention relates in general to ceramic electrolytes and fuel cell devices utilizing them, and to the laser micromachining of electrolyte sheets and electrolyte supported multi-cell solid oxide fuel cell devices.

2. Technical Background

The present invention pertains to articles formed by laser processing of solid oxide fuel cell electrolyte sheets, as well as manufacture of electrolyte supported solid oxide fuel cells and fuel cell devices.

Solid oxide fuel cell devices incorporating flexible ceramic electrolyte sheets are known. In such fuel cell devices, often one or more electrolyte sheets are supported within a housing, on a frame, or between a pair of mounting assemblies, which might be either a frame or a manifold. The electrolyte sheets may be utilized either in a multi-cell or single cell design.

A common approach utilizes a fuel cell device that consists of a single cell design where the thickest component of the fuel cell is an anode layer. This anode layer acts as both support and catalyst and can be about 100 to 1000 microns in thickness and is often formed from a composite of nickel and yttria stabilized zirconia. Such single cells further include a thin electrolyte layer overlying the anode layer, and a cathode layer overlying the electrolyte.

In a multi-cell design, such as that disclosed in U.S. Pat. No. 6,623,881 assigned to Corning Incorporated, the fuel cell device includes an electrolyte sheet in the form of a thin ceramic sheet (e.g., zirconia doped with yttrium oxide ($Y_2O_3$)). The zirconia based electrolyte sheet may be 20-30 microns thick. Typically, the doped zirconia electrolyte sheet supports a plurality of cells, each of which is formed by an anode and cathode layer on either side of the doped zirconia sheet. The thin pre-sintered electrolyte sheet can support either a single anode and cathode pair, thereby forming a one cell device, or multiple anodes and cathodes and a plurality of cells are fabricated on a common electrolyte substrate and are interconnected, through the thickness of the electrolyte sheet by the conductive via connectors (vias).

In order to avoid fracturing of electrolyte sheets, the fuel cell device fabrication process typically utilizes mechanical punching of the via holes and mechanical cutting of the device edges while the electrolyte sheet is in the un-fired state. The process of mechanically punching of unfired ceramic electrolyte sheets requires predicting the sintering shrinkage of a particular electrolyte batch in particular furnace conditions. If the prediction is off, the punched via holes will be misaligned after sintering. After punching and cutting, the electrolyte is fired and typically undergoes 15% to 30% linear shrinkage due to the de-binding and sintering process. Larger electrolyte pieces require better accuracy in shrinkage values to maintain the tolerances needed for device fabrication, especially with multi-cell devices. For example, an electrolyte length of 50 cm and via hole positioning tolerances of +/−200 μm in the sintered state, corresponds to predicting the electrolyte shrinkage by better than +/−0.05%. Mechanically punching and cutting of the un-fired electrolyte puts limitations on the fabrication speed, feature size, wrinkle, and edge quality produced. Also, machining of parts in the un-fired state requires an accurate prediction of part shrinkage in order to maintain dimensional tolerances. Such prediction is very difficult to do with the desired accuracy and require actual devices to be sacrificed for testing.

The general use of laser micromachining thick ceramics is known. It is applicable to machining of bulk ceramic pieces with thickness of 250 μm or larger, and not thin electrolyte films of thickness of less than 50 μm. Thin (less than 50 μm) zirconia based sintered electrolyte sheets are brittle when they are either cut or/and drilled by mechanical means, due to crack formation.

The process of forming via holes in sintered ceramic substrates for electronic components is described in U.S. Pat. No. 6,270,601. This patent discloses use of either mechanical or laser drilling of thick sintered ceramic substrate with thicknesses of 3-60 mils (76.2 to 1524 μm). This reference suggests that laser drilling of sintered ceramic pieces may be achieved by using either $CO_2$ or excimer laser systems. No details are provided on how to laser machine via holes in sintered electrolyte sheets. Applicants attempted to utilize $CO_2$ laser in drilling thin zirconia ceramic electrolyte sheets, but were not successful due to a large number of cracks created by thermal effects. U.S. Pat. No. 6,270,601 also provided no guidance on how to utilize excimer laser for successful cutting or drilling of the electrolyte sheets.

US patent publication No 2002/0012825 describes a fuel cell electrolyte sheet with 3-dimensional features micromachined on its surface. This application does not teach or suggest that it is possible to laser machine electrolyte sheets after sintering.

Prior efforts to produce flat electrolyte of thicknesses greater than 50 μm has led to waves or dimples and edge burrs as described in European Patent EP 1063212B1. This reference discloses stacking of electrolyte sheets during sintering, to limit the wave and burr heights to under 100 μm. The reference teaches that zirconia sheets and other ceramics sheets are brittle when subjected to external forces in a bending direction. In contrast, fuel cells formed from thin flexible electrolyte can withstand significant bending without failure. However, they also develop edge curl when sintered, and the edge curl can produce stress, and fracture the sheet when the curl is flattened.

SUMMARY OF THE INVENTION

This invention utilizes laser micromachining of the sintered electrolyte sheets and fuel cell devices in order to cut the electrolyte sheets and/or fuel cell device components to size, to trim the edges of sintered electrolyte sheet edges or fuel cell devices, and/or to produce via holes and surface modifications or patterns.

According to one aspect of the present invention a sintered electrolyte sheet comprises: a body of no more than 45 μm thick, and laser machined features having at least one edge surface exhibiting at least 10% ablation. According to one embodiment, this edge surface exhibits more than 50% fracture and less than 50% ablation.

According to one embodiment of the present invention a method of micromachining an electrolyte sheet comprises: (i) supporting a sintered electrolyte sheet; (ii) micromachining the electrolyte sheet with a laser wherein said laser has a wavelength of less than 2 μm, fluence of less than 200 Joules/ cm², and repetition rate (RR) between 30 Hz and 200 KHz. Preferably, the cutting speed greater than 30 mm/sec. Preferably, the laser wavelength is less than 400 nm, repetition rate (RR) between 30 KHz and 200 KHz. In some embodiments, laser fluence is less than 30 Joules/cm². According to some embodiments, the laser micromaching process combines the ablation and auto-cleaving (auto-fracturing) into a single occurrence and increases the cutting speed capability. According to some embodiments, the laser is a n laser (pulse duration <1 µs, for example 1 to 100 ns). According to some embodiments, this laser is a 355 nm laser.

The disclosed method is applicable to manufacture of features formed by laser micromachining electrolyte supported multi-cell fuel cell devices, and is applicable for manufacturing of flexible electrolyte supported SOFC devices. As stated above, it is applicable to cutting, shaping and drilling of solid oxide fuel cell electrolytes of less than 45 µm thick and enables novel designs and manufacturing processes of the fuel cell devices.

One advantage of the present invention is that it advantageously allows fabrication of new fuel cell designs, and/or advantageously increases the fabrication yield and strength of the current fuel cell devices. More specifically, the speed, placement accuracy, and resulting quality of the electrolyte sheet edge(s) enable flexibility in device design, handling, and improved electrolyte sheet edge strength. Preferably, the surface roughness of the laser micromachined regions is less than 0.5 µm RMS, more preferably less than 0.4 µm RMS. Preferably this surface exhibits peak-to-valley roughness of less than 5.5 µm, or Ra surface roughness of less than 0.3 µm. Fuel Cell devices can also be drilled, cut, or micromachined at various times during the fabrication process resulting in fuel cell devices with unique attributes such as complex perimeter shapes or via hole patterns, electrodes or other layers existing up to the electrolyte edge, and thin electrolyte areas less than 5 µm thick. This micromachining process can be utilized at any desired time after the electrolyte sintering, enabling flexibility in device fabrication. The resulting method advantageously results in devices and electrolyte sheets that have surprising improvements to flatness and strength.

According to one embodiment of the present invention, laser machining of single and multi-cell devices may be performed after sealing or mounting of the fuel cell device(s) in a support or manifold structure, and results in improved: electrolyte sheet edge strength, device flatness, edge quality, fewer and smaller wrinkles, minimized electrolyte sheet edge curl, and process yield and throughput. According to another embodiment, the micromachining may also be performed to cut electrolyte sheets, where multiple fuel cell devices are patterned (e.g., printed) on a single electrolyte sheet and the electrolyte sheets are then optionally laser machined to produce multiple devices, thereby saving time and labor.

The laser micromachining method advantageously enables micromachining of the electrolyte in the sintered state, instead of before firing. This eliminates the need to accurately predict shrinkage during binder burn-out and sintering. It also eliminates the need for this shrinkage to be uniform across the entire electrolyte sheet.

BRIEF DESCRIPTION OF DRAWINGS

FIG. 2a illustrates a via hole drilled through an electrolyte sheet. FIG. 2b illustrates an exemplary via hole drilled through the electrolyte sheet and an anode.

FIG. 6a is a photograph of the top surface of the sintered electrolyte sheet (i.e., the surface where laser beam was incident on) and FIG. 6b is a photograph of the bottom surface of the sintered electrolyte sheet (i.e., the surface where laser beam was exiting from).

FIGS. 7a and 7b are SEM photos of laser micromachined edges on sintered electrolyte sheet. FIG. 7a is a top view (surface where laser was incident) and FIG. 7b is a cross-section view of the micromachined edge face.

FIG. 8 illustrates another laser cutting system.

FIG. 9a illustrates a cross sectional view of a laser cut edge. FIG. 9b illustrates the edge profile of a laser cut edge (receding away from the picture). FIG. 9c is similar to that of FIG. 9a, but shows higher magnification of a laser cut edge cross-section. It also illustrates effects of individual laser pulses in the upper ablation region.

FIG. 12a is a line scan starting at mechanically cut and sintered edge. FIG. 12b is a line scan starting at a laser micromachined sintered electrolyte sheet edge.

FIG. 13a illustrates a cross sectional view of a laser cut edge. FIG. 13b is similar to that of FIG. 13a, but shows higher magnification of a laser cut edge cross-section. It also illustrates effects of individual laser pulses in the upper ablation region. FIG. 13c illustrates the edge profile of a laser cut edge (receding away from the picture).

FIG. 14a is a line scan starting at a laser micromachined sintered electrolyte sheet edge. FIG. 14b is a line scan starting at mechanically cut and sintered edge.

FIG. 15a illustrates a cross sectional view of a laser cut edge. FIG. 15b is similar to that of FIG. 15a, but shows higher magnification of a laser cut edge cross-section. FIG. 15c illustrates the edge profile of a laser cut edge (receding away from the picture).

FIG. 16a illustrates a cross sectional view of a laser cut edge. FIG. 16b is similar to that of FIG. 16a, but shows higher magnification of a laser cut edge cross-section. It also illustrates effects of individual laser pulses in the upper ablation region. FIG. 16c illustrates the edge profile of a laser cut edge (receding away from the picture).

FIG. 20a is a photograph of the top surface of the sintered electrolyte sheet (i.e., the surface where laser beam was incident on) and FIG. 20b is a photograph of the cross-sectional surface of the sintered electrolyte sheet.

FIG. 21a, c, e are photographs of the top surfaces of the sintered electrolyte sheet (i.e., the surface where laser beam was incident on) and FIG. 21b, d, f are photographs of the cross-sectional surface of the sintered electrolyte sheet.

FIG. 22 shows edge contour plots of (top) electrolyte sheet after mechanical cutting and sintering, and (bottom) after removing 2 mm from edge with laser micromachining.

FIGS. 23a and 23b are SEM images of a 60 µm hole micromachined with a femtosecond laser in a sintered electrolyte sheet. FIG. 23a is a photograph of the top (laser incident) side and FIG. 23b is a photograph of the bottom (laser beam exit) side.

FIG. 24a illustrates an electrolyte sheet edge surface that was mechanically cut (in green state) before sintering. FIG. 24b illustrates laser cut (micromachined) sintered edge. Length of scale bar is 10 µm.

FIG. 26a illustrates an electrolyte sheet with single electrode layer, FIG. 26b illustrates a laser micromachined feature, FIG. 26c illustrates a fuel cell device with a second electrode situated over the micromachined feature (window).

DETAILED TECHNICAL DESCRIPTION OF THE INVENTION

Figure 1A:
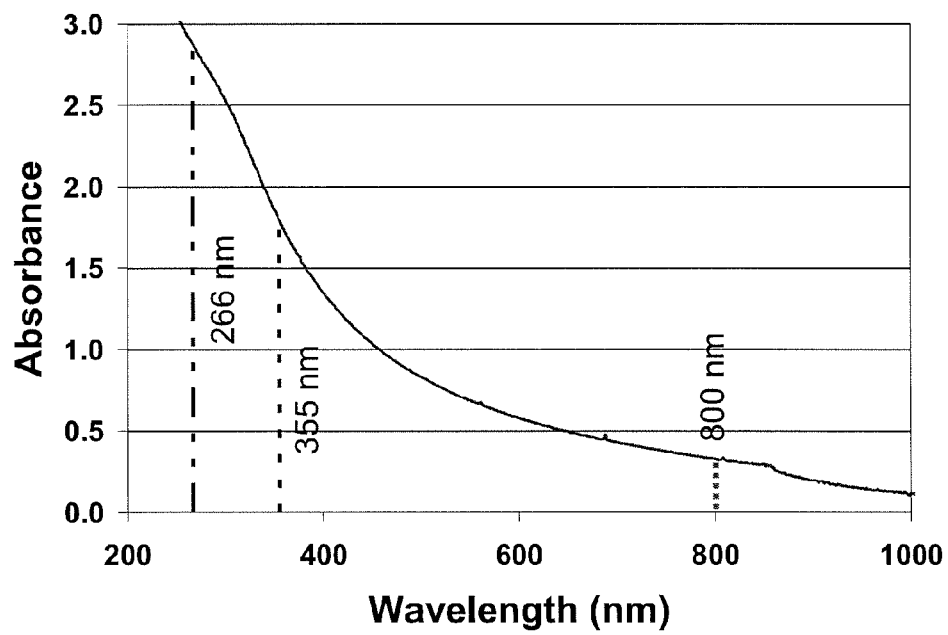
FIG. 1A illustrates the absorption of zirconia as a function of wavelength.

According to some embodiments a method for laser micromachining of fuel cell electrolyte sheets 100 and fuel cell devices 150 includes the steps of: (i) supporting a sintered electrolyte sheet or fuel cell device; (ii) micromachining the electrolyte sheet or the fuel cell device with a laser 160 at a cutting speed of more than 20 mm/sec, preferably more than 30 mm/sec, and more preferably more than 35 mm/sec; wherein said laser 160 has a wavelength of less than 2 µm; optical power of more than 2W, and/or laser fluence of less than 30 Joules/cm$^2$; and repetition rate (RR) between 30 Hz and 1 MHz. Preferably, the laser wavelength is less than 400 nm and even more preferably less than 300 nm, repetition rate (RR) is between 30 KHz and 200 KHz. In some embodiments laser fluence is less than 400 Joules/cm$^2$, for example 350 Joules/cm$^2$ or less, or even less than 26 Joules/cm$^2$. In some embodiments the laser wavelength is 355 nm, in other embodiments the laser wavelength is in 200 nm-300 nm range.

This method can be successfully applied to flexible ceramic electrolyte sheets with a thickness of 45 µm or less and advantageously produces no significant microcracking at or adjacent to the micromachined surfaces. For example, this method can be utilized with thin sintered ceramic electrolyte sheets 100 (e.g., zirconia electrolyte sheets) to produce via holes 102, cut edges 103, and surface patterns 105 (e.g., micro windows). According to some embodiments (described below), this method results in electrolyte sheet 100 with laser machined features 102, 103, 105 having at least one edge surface 104 with at least 10% ablation (region 110). According to at least one embodiment, this edge surface exhibits more than 50% fracture (region 112) and less than 50% ablation. According to some embodiments, the surface roughness of the laser micromachined edge surface 104 is less than 0.5 µm RMS, more preferably less than 0.4 µm RMS. Preferably the edge surface 104 exhibits peak-to-valley roughness of less than 5.5 µm, or Ra surface roughness of less than 0.3 µm. According to some embodiments, the peak-to-valley surface roughness of the electrolyte sheet in an area on the laser micromachined edge surface (at the edge) is 0.2 to 5.5 µm, preferably 1 to 5 µm, more preferably less than 4 µm. According to some embodiments the laser micromachined surface 104 has average crystal grain size of less than 1 µm. According to some embodiments the fractured surface region 112 has smaller average crystal grain size than that of the crystals in the transition zone 114 between the fracture region and the ablation region.

Laser ablation and/or laser induced breakdown based micromachining uses high intensity laser pulses provided by a laser 160 to selectively remove material. Laser micromachining can be done, for example, with long pulse UV lasers, and ultrashort pulse lasers such as pico-second (ps) and femtosecond (fs) lasers. For example, we can utilize pico-second lasers such as the Nd:YVO$_4$ lasers with a mode-locked seeder and power amplifiers, or femtosecond lasers such as Ti:Saphhire laser with a regenerative amplifier system; as well as ultrafast (i.e., with pulse duration <100 ps) fiber lasers. Nanosecond (ns) diode-pumped solid state (DPSS) lasers such as 3$^{rd}$ (355 nm) and 4$^{th}$ (266 nm) harmonics of Nd:YAG and Nd:YVO$_4$ lasers are also well suited for use with the method of the laser micromachining according to the embodiments of the present invention.

FIG. 1a illustrates relative optical absorption of zirconia based electrolyte sheets as a function of laser wavelength. Optical absorption of zirconia is characterized by relatively little absorption in visible wavelengths and significant scattering due to the multi-crystal grain nature of the material. Laser micromachining with nanosecond UV (<400 nm) or deep UV (<300 nm) lasers has the advantage of producing a small or insignificant heat-affected zone, and smaller feature sizes than those carried out using visible and infrared lasers. Photons from UV or deep UV lasers are absorbed by the targeted material and have enough energy to break down material directly. UV and deep UV laser light can be focused down to smaller diffraction limited sizes and can machine smaller features than visible and infrared laser light.

Laser micromachining with ultrashort (<100 ps) pulse lasers also can produce small features with limited (i.e., small) or no heat affected zone, although the underlying principle of micromachining operation is fundamentally different. Because ultrashort pulse laser micromachining is based on nonlinear absorption of light in the material, the target material does not need to absorb laser light directly. Instead, the electric field in an ultrashort pulse laser is so extreme that initial unbound electrons in the target material are accelerated to create a cascade of free electrons through collisions. The cascade of free electrons results in break-down of targeted material. Because ultrashort laser machining is based on non-linear absorption, it is not limited by diffraction. Features as small as tens of nanometers have been machined using this method.

Typical techniques used in laser via hole drilling/cutting (i.e., laser micromachining) applications according to some embodiments are percussion drilling, trepanning, and helical drilling. In percussion drilling, the laser focal spot is fixed and a train of laser pulses is used to ablate through the material. Trepanning technique is utilized for manufacturing large holes, and it is essentially a percussion drilling process along a circular path. In contrast to trepanning, the helical drilling reaches the breakthrough only after many turns of spiral describing the path of the ablation front. Helical drilling (cutting by laser micromachining) is not limited to circular geometry. Holes of any shape can be made by the use of scanner or translation stages.

Figure 1B:
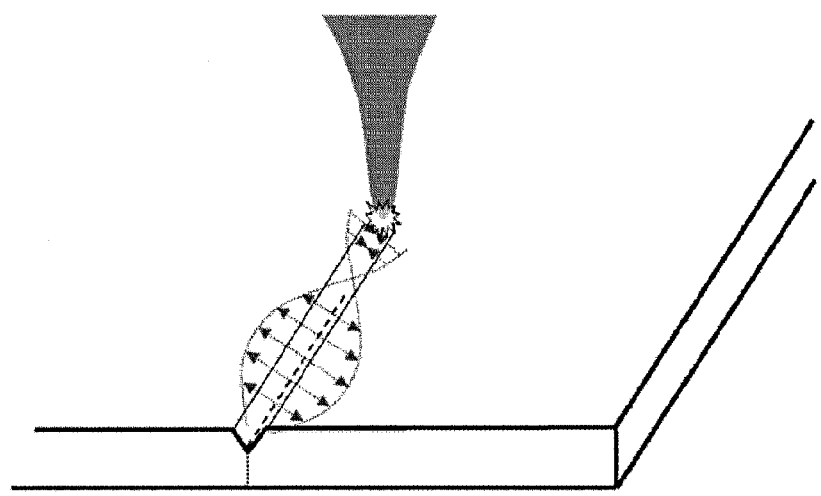
FIG. 1B illustrate schematically the process of scoring an electrolyte sheet with a laser beam.
Figure 1C:
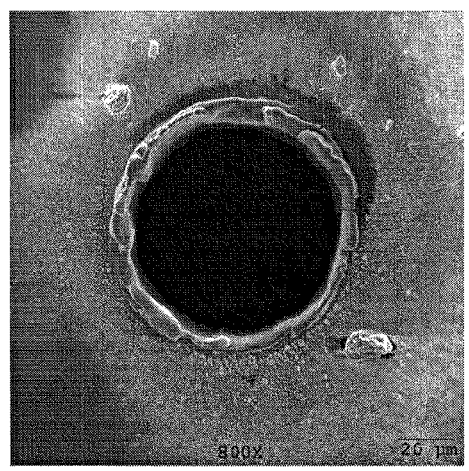
FIG. 1C illustrates a via hole according to one embodiment of the present invention.

Cutting, edge trimming, or hole drilling/cutting of electrolyte sheet or fuel cell devices by laser micromachining may be performed by either completely ablating the targeted material (for example, with a femtosecond laser), or by scoring (via ablation) and fracturing the targeting material (for example, with a 266 or a 355 nm nanosecond laser). This is shown schematically in FIG. 1B. The fracturing through the thickness of the electrolyte sheet occurs as a result of an auto-cleaving (auto-fracturing) due to thermal stress across the depth of the electrolyte material. When laser micromachining (of electrolyte sheets or fuel cell devices) utilizes fracture of the targeted material via auto cleaving (such that >50% of the thickness is fractured), this process results in laser cutting speeds of over 30 mm/sec. Small diameter hole drilling can be performed using ablation, by utilizing high speeds (faster than 30 mm/sec) and low pulse energies (for example, below 60 µJ, or below 50 µJ, 40 µJ, 3 µJ, 20 µJ, 17 µJ or 15 µJ) to minimize microcrack formation around the perimeter of the hole. (See FIG. 1C) If laser micromachining of zirconia based electrolyte sheets is done mostly through ablation (e.g., ablating 90% to 100% of the targeted material), according to some of the embodiments the electrolyte sheet 100 has grain growth of less than about 2 µm on the cut (ablated) surface. That is, the grain size at or immediately adjacent to the ablated surface is larger than the grain size on another area (non-ablated area) of the electrolyte sheet. For example, a typical grain size in a non-ablated surface may be 0.2 to 0.5 µm, while the ablated surface may exhibit grain larger grain sizes (e.g., 0.9 µm, 1 µm, 1.3 µm, 1.5 µm, or 2 µm).

One advantage of the method of the present invention is that this method: (i) advantageously allows fabrication of new fuel cell designs such as complex non-rectangular electrolyte shapes and via hole patterns, complex non-circular via hole shapes, micromachined thin electrolyte regions less than 5 µm thick; and/or (ii) advantageously increases the fabrication yield and strength of the current fuel cell devices. More specifically, the speed, placement accuracy, and resulting electrolyte edge quality enable flexibility in device design, handling, and edge strength. The inventive laser micromachining process can be utilized at any desired time after the electrolyte sintering, enabling flexibility in device fabrication. A typical fuel cell device 150 includes an electrolyte sheet 100, at least one and preferably a plurality of electrode pairs 152 (cathodes and anodes), electrical connectors (e.g., conductive vias situated within via holes), bus bars, and other, optional layers. Fuel cell devices 150 can also be advantageously drilled, cut, or micromachined at various times during the fabrication process resulting in fuel cell devices with unique attributes such as shapes, flatness, and strength. The resulting method advantageously results in fuel cell devices and electrolyte sheets that have surprising improvements to flatness and strength (for example, peak-valley flatness less than 50 µm and bend strength greater than 2 GPa). For example, according to one embodiment of the present invention, laser machining of single and multi-cell solid oxide fuel cell devices may be performed after sealing or mounting of the fuel cell device(s) in a support or manifold structure, which results in improved edge strength, edge quality, handling, and process yield and throughput. According to another embodiment, multiple fuel cell devices are printed on a single electrolyte sheet, and the electrolyte sheets are then cut (laser micromachined) to separate the fuel devices from one another, thus simultaneously producing multiple devices, thereby saving time and labor, and increasing throughput.

During the laser micromachining process, either the electrolyte sheet 100 (or the fuel cell device 150) can be mechanically moved, or the laser beam provided by the laser 160 can be scanned across the electrolyte sheet (or the fuel cell device) for faster processing. Also, the output from one laser can be split into multiple micromachining laser beams to speed up the write time. Some embodiments of the present invention exhibit improved electrolyte sheet edge strength (bend strength) of greater than 1.8 GPa. Some embodiments of the present invention exhibit electrolyte sheet edge strength (bend strength) of greater than 2 GPa. This strength is measured in a 2-point bend system where the laser micromachined 2 cm×8 cm electrolyte sheet sample is bent upon itself between approaching parallel plates until it breaks into two approximately 2 cm by 4 cm sections.

Improved Edges:

Mechanical cutting and punching requires close attention to the cutting tool maintenance to avoid tearing of the electrolyte edges. Laser micromachining of sintered ceramic electrolyte sheets 100 according to the embodiments of the present invention is capable of advantageously producing a cut edge with an edge surface 104 that has less roughness, chips, tears, or other stress concentrating features than an edge produced by mechanical cutting. This improves the edge strength of the electrolyte sheet, and can advantageously reduce the number of electrolyte pieces damaged during manufacturing due to breakage at the edges.

As the electrolyte sheet's dimensions increase, it experiences higher stresses during handling and sintering cycles. The laser micromachined fuel cell devices 150 and electrolyte sheets 100 with higher edge strength will result in lower amounts of the electrolyte sheet breakage during fabrication.

Improved Manufacturability and Quality:

Laser cutting device substrates (electrolyte sheets of the desired size) out of an over-sized sintered electrolyte sheet enables the over-sized electrolyte sheet to be positioned using only coarse mechanical alignment. Since laser via hole drilling and edge cutting of a sintered electrolyte sheet can occur during the same step, precise alignment to a pre-formed edge is not required. In this case, the over-sized electrolyte sheet is placed on the translation stage (e.g., XY stage or XYZ stage) such that a near-perfect area is selected and laser cut out (micromachined) for device fabrication. The ability to adjust the position of fabricated fuel cell devices makes it possible to avoid electrolyte sheet defects 101. The precise location of the cut-out electrolyte sheet piece can be adjusted within the over-sized electrolyte sheet to avoid identified defects. This improves overall device quality and process throughput.

Laser micromachining can also be used to cut the sintered electrolyte to the correct shape (rectangular, circular, or other) and size. Typically, the electrolyte sheet is mechanically cut in the un-fired state and then sintered. Thus, the shrinkage that will occur during sintering needs to be accurately predicted, which is difficult to do. Laser micromachining of sintered electrolyte sheets does not require accurate positioning.

For example, the fabricated 10-cell devices 150 with overall dimensions of 12 cm×15 cm may have tight tolerances for example +/−1 mm in order to fit in the mounting frame. Using laser micromachining to cut the electrolyte sheet 100 to size eliminates the need for accurate shrinkage control during sintering. Also, the laser micromachining can occur at arbitrary times during the fabrication process. For example the electrolyte sheet 100 can be cut before, after, or between the separate electrode material printing/firing steps.

If the electrolyte sheet is mechanically cut to size and punched while attached to the Teflon carrier film for handling purposes, the mechanical cutting and punching damages the carrier film and makes it impractical to recycle. Because laser micromachining occurs when the electrolyte sheet is in the fired state, the electrolyte carrier film (e.g. Teflon carrier) can now be continuously recycled.

Complex Configurations:

Laser micromachining allows fabrication of new fuel cell device designs that are not possible or practical through mechanical cutting. For example, electrolyte sheets 100 can be laser cut into complex non-rectangular shapes, any desired patterns, and edges can be cut in very close proximity to previously printed layers. Achieving this by mechanical cutting of green (i.e., unsintered electrolyte sheets) would require very accurate prediction of part shrinkage during sintering, which is hard or impossible to achieve in manufacturing (commercial scale).

Laser micromachining does not require a rigid back support like mechanical cutting, and various lens systems or an auto-focusing process can be incorporated in the setup. This allows via hole drilling and edge cutting to occur on electrolyte sheets with arbitrary surface profiles, contours, and corrugations that would have been difficult or impossible with mechanical means. More specifically, the laser beam depth of focus and shape can be modified to either cut corrugated structures with large surface contours or produce shaped edge profiles. Electrolyte sheet corrugations are useful for improving the strain tolerance of the device as described in U.S. Pat. No. 6,582,845B2, but are difficult or impossible to accurately cut or mechanically punch in the green, unfired state. The laser micromachining process according to the present invention enables cutting and via hole formation in corrugated pre-fired electrolyte with height variations of greater than 100 µm, 250 µm, or even 1000 µm or more, which may be useful for strain relief.

Improved Vias:

Laser micromachining enables efficient production of high quality via holes 102 with diameters of less than 75 µm (e.g., 60 µm, 45 µm, 40 µm, 30 µm, 25 µm, or 20 µm), punching/cutting through printed electrodes or other layers, complex non-circular via shapes, and complex patterns of via holes.

According to some embodiments, laser micromachining process can be used to manufacture via holes 102 in sintered electrolyte sheet 100, instead of mechanical punching in the un-fired state. The process of mechanically punching of unfired ceramics requires predicting the sintering shrinkage of a particular electrolyte batch in particular furnace conditions. If the prediction is off, the punched via holes will be misaligned after sintering. Electrolyte shrinkage during sintering may be from 15% to 30%. Larger electrolyte sheets require better accuracy in shrinkage values to maintain the tolerances needed for device fabrication, especially with multi-cell devices. For example, an electrolyte length of 50 cm and via hole positioning tolerances (i.e., registration repeatability) of +/−200 µm in the sintered state, corresponds to predicting the electrolyte shrinkage by better than +/−0.05%. Laser micromachining of the via holes 102 in sintered electrolyte sheet 100, however, eliminates the need to accurately predict electrolyte shrinkage during sintering because, after sintering, no distortion of the electrolyte will occur to misalign the via hole patterns.

Figures 2A, 2B:
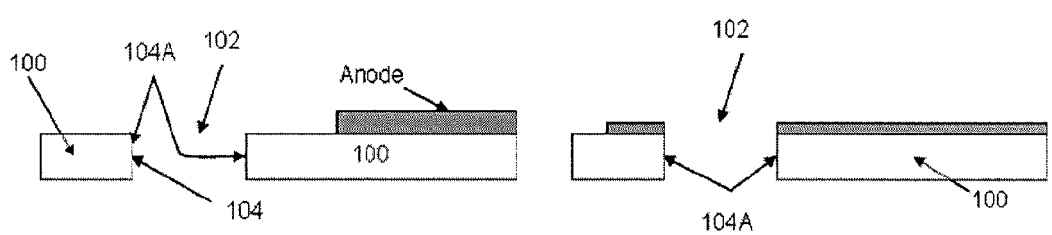
FIGS. 2a and 2b are schematic cross-sectional views of exemplary via holes achieved with laser micromachining.

Practical mechanical punching of via holes limits the hole diameter to approximately 75 µm minimum after firing. Although mechanical punches of 50 µm are known, lifetime of the mechanical punch at these diameters is very small. Laser micromachining the via holes 102 allows a practical reduction in hole diameter (less than 75 µm) as well as the fabrication of arbitrary hole patterns. For example, a pattern of several smaller via holes arranged in clusters can take the place of one 75 µm diameter via hole. The smaller via hole diameters enable more efficient via filling. Micromachining also enables the creation of via holes 102 at optimum times in the fabrication process. Holes can even be formed in several material layers attached to the electrolyte sheet. For example, holes can be micromachined after the anode layer 103 situated on the zirconia based electrolyte sheet 100 has been printed and fired, which creates a continuous via hole through both layers (electrolyte sheet 100 and the anode 103) simultaneously. FIGS. 2a, 2b respectively, illustrate schematically examples of via holes 102 drilled through the electrolyte sheet 100 and the electrolyte sheet/anode layers 100, 103. Different via hole cross-section geometries (for example, non-circular) are also possible to achieve by this method.

As a comparison, mechanically punching via holes with diameters of less than 75 µm have reduced equipment lifetime due to punch breakage. Smaller than 75 µm diameter via holes with aspect ratio (L/D) of length (electrolyte thickness) to hole diameter of approximately 1:1 (i.e., 0.3:1 to 2:1) will have more efficient filling as well and improved durability. The smaller via holes 102 filled with the conductive material would have reduced voids and defects and therefore have extended mechanical durability. Larger via holes (larger than 75 µm, and especially larger than 100 µm in diameter) have a greater tendency to form voids in the via fill on sintering, while smaller via provide a higher ratio of surface to via volume, countering this tendency. The ability to laser micromachine smaller via holes 102 in sintered electrolyte sheets 100 enables better quality filling and sintering of the conductive via fill material. Thus, it is preferable that via holes 102 be less than 75 microns in diameter, and more preferably less than 50 microns, with 0.3:1 to 1:5, and even more preferably 0.3:1 to 1:1 L/D aspect ratio. Most preferred are via holes with diameters of less than 25 microns and aspect ratios of approximately ratio of 1:1.25. The drilling of small via holes with the preferred aspect ratios is advantageously enabled by the above described laser micromachining method according to the present invention.

With the small via hole diameters it may be advantageous to increase the number of via holes in order to maintain the resistance of the current path through the vias. Reducing the via hole diameter from 75 µm to 50 µm entails a cross-section reduction of approximately 66%. The cross-section reduction is defined as 1—(area of 50 um diameter via)/(area of 75 um diameter via). In this case, the number of vias may be increased by a factor of 2 to 2.5 to compensate for the reduction in area (cross-section). However, in many cases an increase in the number of vias is not necessary because the via resistance is not a limiting factor. In the case of vias with less than 50 μm diameters, it may be preferred that clusters or groupings of smaller vias are used to replace one single large via. For example, nine 25 μm vias holes have the same cross-sectional area as one 75 μm via hole and could effectively replace that single via. These small via holes can be grouped in any number of ways including linear arrays of via holes, circular or rectangular cluster(s) of the via holes 102, or any pattern providing both good mechanical integrity and adequate current distribution.

Figure 3:
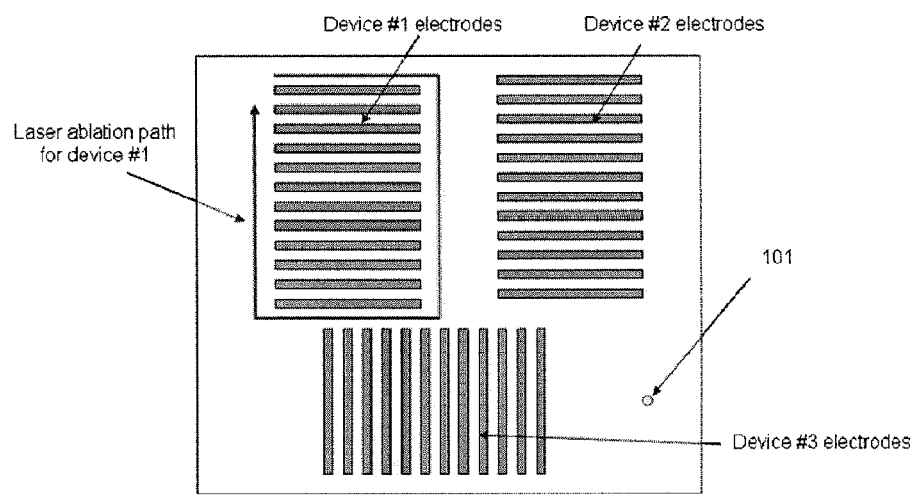
FIG. 3 illustrates schematically utilization of laser micromachining for cutting out multiple fuel cell devices fabricated on a common electrolyte sheet substrate.

Multiple Device Manufacturing:

Because mechanical cutting of sintered electrolyte would cause uncontrolled cracking and drastically reduce the strength due to the defects created, mechanical cutting is typically performed on green (i.e., unsintered) electrolytes. However, because mechanical cutting requires the electrolyte sheets to be cut to size in the un-fired state, only one fuel cell device can be fabricated per substrate. The ability to laser cut or ablate the sintered electrolyte sheet at arbitrary times during fuel cell device manufacture allows more than one fuel cell device 150 to be fabricated on a single over-sized electrolyte sheet substrate 100. (See FIG. 3.) After the fuel cell devices are complete, they can be cut out by using laser micromachining, and thus separated from one another. This approach can be used to fabricate multiple fuel cell devices in parallel to increase fabrication yield. If an over-sized electrolyte sheet is used, the fuel cell device patterns can also be shifted as needed to avoid electrolyte sheet defects 101 and further increase yield. FIG. 3 illustrates schematically the concept of fabricating multiple fuel cell devices on a single, common, electrolyte sheet, and separating them (via laser cutting) after the last printing/firing step. The exemplary laser cutting path (ablation path) is illustrated schematically by an arrow 2 around one of the devices. The laser ablation path is creating a new edge surface as the fuel cell device is being cut out. Thus, laser micromachining allows the fuel cell devices to be cut out of the electrolyte at arbitrary times during the fabrication process. Fabrication of multiple fuel cell devices on a single electrolyte sheet 100 reduces the number of handling steps by a factor equal to the number of fuel cell devices printed simultaneously. Thus, although one fuel cell device may be printed at a time on a single sheet of electrolyte, it is preferred that two or more fuel cell devices 150 be printed on a single sintered electrolyte sheet 100 and that the completed fuel cell devices 150 are laser cut away from each other after fabrication. That is, anodes and cathodes and other layers (if needed) are printed on a sintered electrolyte sheet 100, the via holes are drilled and filled, and the electrolyte sheet 100 supporting at least partially printed multiple fuel cell devices is then fired (sintered). After sintering, the electrolyte sheet 100 is laser micromachined, to cut out the completed or partially completed fuel cell devices 150. For small fuel cell devices, 10, 20 or more may be printed on a single electrolyte sheet 100 measuring 30 cm or more in width or length. It is noted that the fuel cell devices 150 may be identical or of varying design. For example, the fuel cell devices 150 situated on a single sintered electrolyte sheet 100 can be multi-cell devices, single cell devices, or a combination of both. These fuel cell devices may be of the same size, or of different sizes and may have the same or different aspect ratios (width/length).

Manufacturing multiple devices 150 on a single electrolyte sheet 100 minimizes edge wrinkling, curling and unwanted thickness variation, because these problems occur mostly at the edges of the electrolyte sheet, and not in-between the devices. In addition it minimizes the frequency of device(s) handling and the amount of time each device is handled, which leads to increased yield.

Minimization of Electrolyte Sheet Edge Curl and/or Wrinkles:

Laser micromachining allows the electrolyte sheet to be over-sized in the green state, and than be cut to shape after sintering. If any edge curling or edge wrinkling occurs while the electrolyte sheet sinters, the wrinkles and/or curl(s) can be cut off with the laser after sintering. Material removal after sintering of the electrolyte sheet eliminates any need for electrolyte sheet stacking or for applying weight to the electrolyte sheets during sintering, as a means of reducing edge curl. It is preferred that the outer 1 mm to 5 mm region of the electrolyte sheet be removed after sintering, in order to reduce or eliminate this edge curl. Trimming of over 1 mm off the edge of the electrolyte sheet significantly reduces edge curl or edge wrinkling and significantly improves edge surface quality such as roughness along the edge face and probability of an edge crack, tear, or other feature that could concentrate stress. Although it is preferred that the minimum possible amount of material is removed, more of the perimeter may be removed, e.g., 3 cm or more, if needed.

Figure 4:
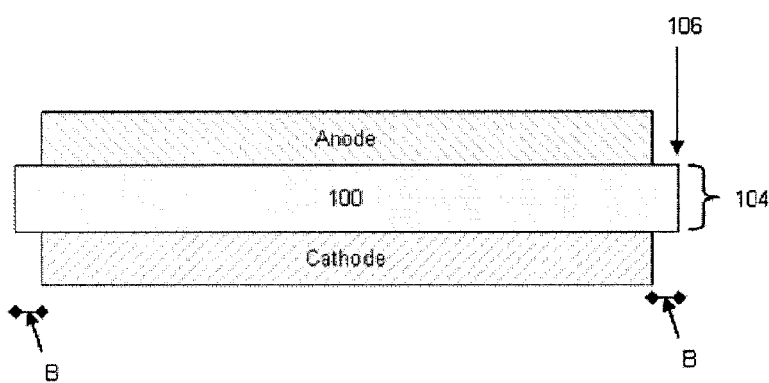
FIG. 4 illustrates schematically a cross-sectional view of a fuel cell device with the anode(s) and cathode(s) situated less than 5 mm from electrolyte sheet edge.

Reduction in Electrolyte Sheet Borders:

Another benefit of using laser micromachining to cut fully fabricated devices 150 from an over-sized electrolyte sheet substrate is a possible reduction of electrolyte sheet border B around the screen printed electrodes 152 (see FIG. 4). Screen printing of a particular electrode pattern (or electrode patterning in general) requires a minimum electrolyte size with dimensions bigger than this pattern. The smaller the electrolyte sheet is, the more difficult it becomes to accurately align and print well defined features at or near the electrolyte sheet edge. Using laser micro-machining, all of the electrode layers can be printed/fired, and then the final device edge can be cut arbitrarily close to (or through) the printed fuel cell electrodes. For example, the resultant electrolyte sheet may have an unprinted boarder that is less than 5 mm, or less than 3 mm, or even less than 2 mm wide. Reduction of electrolyte sheet borders allows new fuel cell device designs that were not previously possible, with the electrodes existing up to the edge of the electrolyte sheet. Also, this creates less non-active area on the electrolyte sheet. The trimmed device 150 may even have an electrolyte sheet 100 that was laser micromachined/trimmed to have no unprinted border(s).

Laser micromachining can be used to cut out or trim fuel cell devices after the final electrode, via fill, or busbar have been deposited and sintered. This allows fuel cell device(s) to be fabricated with much less unprinted (non-active) electrolyte border along the edges than is typically practical for screen printing or handling. For example, laser cutting the perimeter of fuel cell devices after the final fabrication step allows much greater surface utilization of the electrolyte sheet. Over the electrolyte surface, more area can be covered with functional electrodes and contacts if laser cutting/micromachining is used. Similarly, screen printed patterns of electrodes or other additional layers can be made all the way to the edge of the electrolyte without consideration for handling during processing. Typically, in fuel cell devices, only a small portion of the area near the edge may be printed with electrodes or other components due to difficulties with fuel cell device holding and handling. The method of the present invention enables electrodes, bus bars, leads or other components of the devices to cover 5% to 100% (FIG. 4) of the perimeter of the electrolyte sheet 100, to a distance B less than 5 mm of the edge of the electrolyte sheet, or even to the very edge. Laser cutting the edges of fuel cell devices enables the additional features to occupy much more of the device perimeter and allows them to exist much closer to the electrolyte edge than when other cutting methods are used. In the case of laser cutting, any additional electrolyte required for handling or processing concerns can be cut off after the device fabrication is complete.

Laser cutting/micromachining enables the final fuel cell device dimension to be created after mounting the fuel cell device 150 in or to a frame or manifold structure, or in an assembly of multiple fuel cell devices. For example, the electrolyte or fuel cell device can be laser micromachined after it has already been mounted to a frame. This enables a larger device to be carried through the process for handling purposes, including mounting, and then trimmed afterwards to remove the excess. Thus, according to some embodiments of the present invention the laser micromachining method according to the present invention would be used after the mounting of a larger than needed fuel cell device on a frame or in an assembly of multiple devices and then laser cutting or trimming that larger fuel cell device after mounting it to the desired final dimension.

Surface Pattern Machining:

Laser micromachining can be utilized to perform surface pattern machining. Surface machining of electrolyte sheets and/or fuel cell devices includes texturing, roughening, and micro-windowing. Micro-windowing is the process of creating very thin regions in the electrolyte surface. For example, surface patterns 105, such as micro-windows 105' can be laser micromachined into the sintered electrolyte sheet 102 opposite previously printed electrodes (anodes, cathodes) or other layers of the fuel cell devices 150. In this way, thinner electrolyte sheet windows can be created than is possible with molding techniques, because, molding/casting techniques require a minimum electrolyte thickness in the un-fired (i.e., green) electrolyte sheet to survive releasing of the green sheet from the carrier onto which it is cast. Cathodes or other layers can then be printed on the laser micromachined areas, so that the windows will be sandwiched between the anode-cathode pairs or between other printed layers (such as, for example, busbars, or catalyst layers). An embodiment of surface micromachining/patterning is described, for example, in the embodiment of Example 9 and is illustrated in FIGS. 26a-26C and 27a-27d.

Laser cutting the final shape of the electrolyte after fabrication is complete allows quality control test structures to be fabricated in parallel on each electrolyte sheet 100. (For example, small test devices can be fabricated on each electrolyte sheet next to the actual fuel cell devices 150. These small test devices will go through the same fabrication steps and conditions as the actual fuel cell device. When the fabrication is complete, these small test devices (witness samples) can be cut off and evaluated. This allows device performance, non-destructive testing, and destructive testing to occur on these small test quality control samples instead of sacrificing an actual fuel cell device. After fabrication, these structures can be cut off for destructive or other testing. Mechanical cutting would require actual devices to be sacrificed for testing or separate test devices to be fabricated in series.

Examples Using ns Laser Configuration #1
(Example 1a, 1b)

Figure 5:
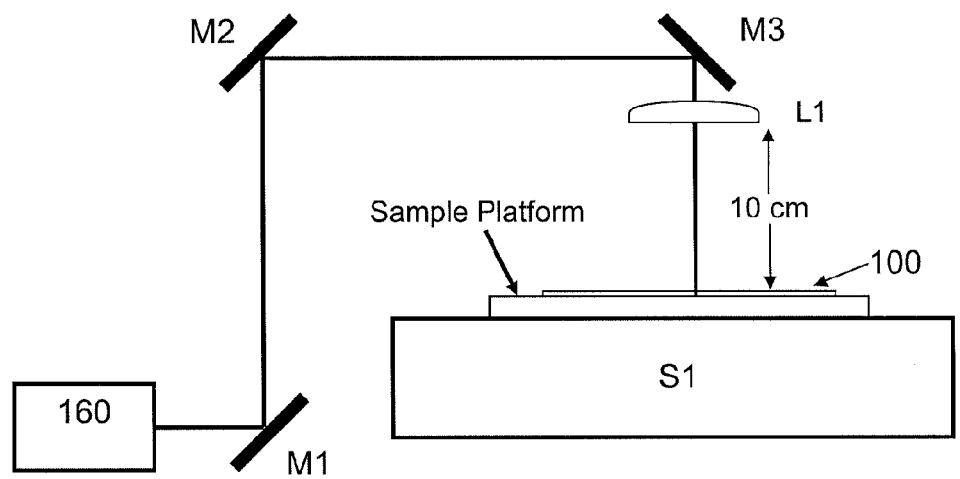
FIG. 5 illustrates one laser cutting system according to an embodiment of the present invention.

In this laser micromachining system configuration (see FIG. 5), frequency-quadrupled ns Nd:YAG laser 160 from Lambda Physik Starline, GmbH. was used with an output wavelength of 266 nm, with an 1 kHz repetition rate, and 2 mJ energy per pulse maximum to micromachine via holes in a ceramic electrolyte sheet 100. A plurality of mirrors $M_i$ direct the laser beam into an optical focusing lens $L_1$. The sintered electrolyte sheet 100 was supported by a movable XY stage $S_1$, and lens $L_1$ directed the focused laser beam onto the electrolyte sheet 100. Pulse duration of the laser 160 was 10 ns. Straight edges, via holes, and curved patterns were micromachined in the sintered 20 µm thick electrolyte sheet 100. The electrolyte sheet was substantially similar in composition and thickness as that described in US patent application 2004/0265663. The depth of focus of the laser beam was about 300 µm. It is noted that either a ps or fs laser system (providing similar or other absorbing wavelengths) can also be utilized. Also, lens systems creating depths of focus ranging from 1 µm to 1 mm can be used independent of the specific laser system. These lens systems allow one to control the spot size and thus the size of the micromachined features. Also, it allows for laser micromachining electrolyte sheets with surface height variations (e.g., corrugated or patterned surfaces). When laser micromachining such electrolyte sheets, the height of the corrugations or surface variations should be equal to or less than the depth of focus.

Example 1a

A plano-convex (PCX) lens $L_1$ with a focal length of 10 cm was used to focus the light in proximity to the zirconia based electrolyte sheet. A simple percussion drilling technique was used. The 266 nm laser 160 had its optical power level set at 340 mW. This power level corresponds to 340 µJ per pulse. Since the diameter of the via hole of this example is about 50 µm, this gives a laser fluence level of roughly 17 J/cm². In the experiment the hole was laser cut/drilled through the electrolyte sheet after less than 2000 pulses or 2 seconds. The minimum fluence level required to observe laser ablation effects (i.e. ablation threshold level) was less than 6 J/cm², e.g., about 1 (0.9 to 1.1 J/cm²). The via shape produced is influenced by the laser beam shape. Laser micromachining, without generating microcracks, was also achieved using a range power levels of 100 to 6000 µJ per pulse, and fluence levels of 5 to 30 J/cm².

Figure 6A:
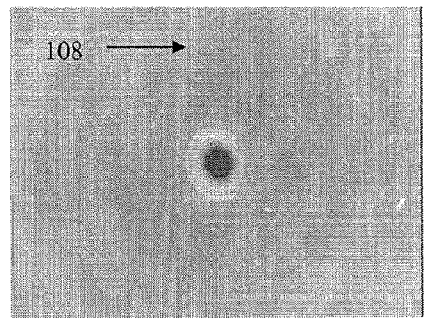
FIGS. 6a and 6b are photographs of an exemplary laser micromachined via hole in a sintered electrolyte sheet.
Figure 6B:
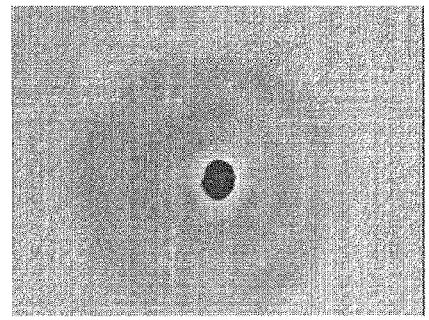

FIG. 6a and FIG. 6b are photographs taken with an optical microscope of the exemplary micromachined via holes. Both the top surface of the electrolyte sheet (i.e., the laser incident side in FIG. 6a) as well as the bottom surface of the electrolyte sheet (i.e., laser exiting surface in FIG. 6b) are shown. Re-deposition of ablated material from the generated plasma was observed on the electrolyte sheet in the form of ring patterns 108, but it is noted that re-deposition can be reduced, for example by utilizing ultrashort (<100 ps) pulsed lasers, by heating the electrolyte sheet 100 to elevated temperatures, or with the use of purge gas or debris collection chamber. FIG. 6a and FIG. 6b illustrate that although the re-deposited region is present (in the form of ring structures around the laser micromachined via holes), there is no observable micro-cracking. The mechanical integrity of the cut edges was observed in accelerated aging by exposing micromachined holes to water vapor at 105° C.-108° C. and 3.5-6.5 psi for over 115 hours. No accelerated transition to the monoclinic structure at the cut edges compared to the bulk material was observed.

Example 1b

FIGS. 7a and 7b are SEM images of straight edges laser micromachined with the above described laser cutting equipment and at the same settings, using a cut speed of 1 mm/s. Cutting speeds of 0.5 to 2 mm/s can be utilized, but the cutting speed was ultimately limited by the laser repetition rate (i.e., max. speed is less than spot size diameter×repetition rate). More specifically, FIG. 7a shows a top view of the laser micromachined edge surface and FIG. 7b shows a side view of the micromachined edge surface. Redeposition 108 is seen as a discolored band near the micromachined edge on the laser incident side is also apparent (see FIG. 7a).

Examples Using ns Laser Configuration #2
(Examples 2 to 4F)

In another embodiment of a laser micromachining system for (nanosecond) laser cutting of sintered zirconia based electrolyte sheet, a frequency-quadrupled Nd:YVO$_4$ laser, made by Spectra-Physics (HIPPO-266QW), was utilized (Examples 2-3B). The output wavelength of this exemplary laser is 266 nm. The ns laser 160, running at a repetition rate of 30 to 120 kHz, has a peak laser power of approximately 2.5 W and a pulse duration of less than 15 ns according to the specifications from the manufacturer. A 3× optical beam expander (BE) and with a 10.3 cm focal length telecentric lens $L_1$ were used in conjunction with the laser 160 to cut the electrolyte sheet 100. (FIG. 8.) Single pulse ablation on electrolyte test samples showed that the focal spot size of the laser beam (beam waist) is about 20 μm in diameter.

Example 2

Figure 9A:
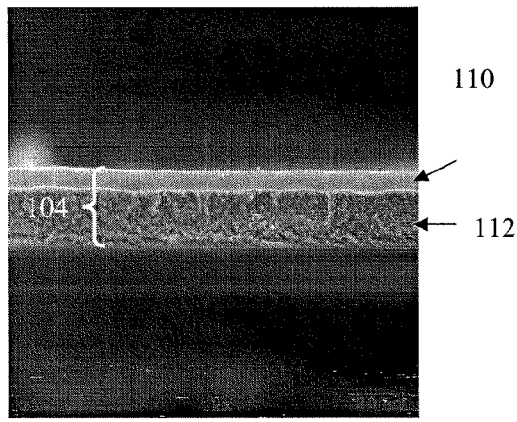
FIGS. 9a-9c are SEM images of a laser cut edge of an exemplary sintered electrolyte sheet.
Figure 9B:
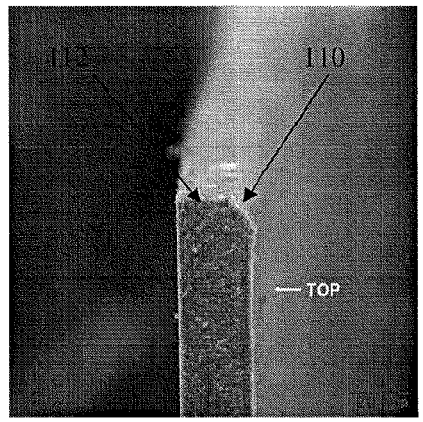
Figure 9C:
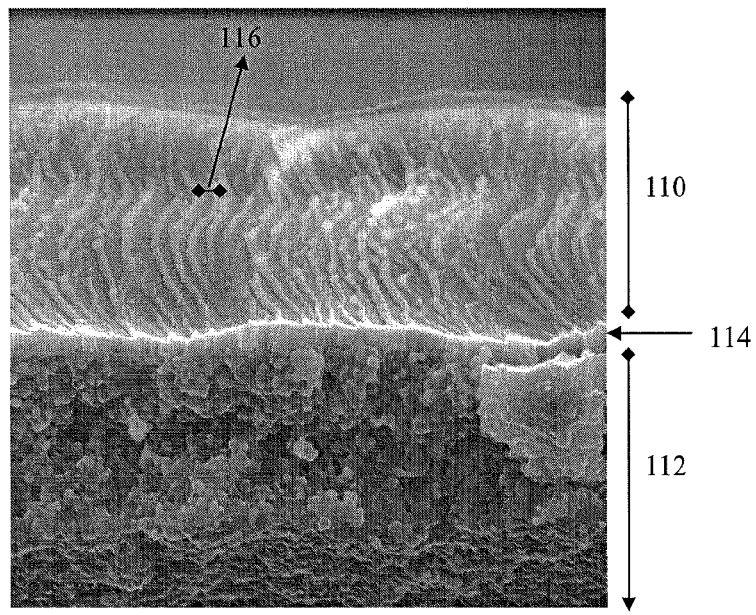

With an optical laser power of 1.7 W, light polarized parallel to the cutting direction, and a repetition rate of 30 kHz, a linear cutting speed of 40 mm/s was achieved with good reproducibility. The fluence level was calculated to be approximately 18 J/cm$^2$. SEM images of the (nanosecond 266 nm laser cut) electrolyte sheet edges of the electrolyte sheet of this exemplary embodiment are shown in FIGS. 9a-9c. FIG. 9a illustrates a cross sectional view of a laser cut edge. Note that the laser ablated area on top and fracture surface at bottom. FIG. 9b illustrates the edge profile of a laser cut edge (receding away from the picture). FIG. 9c is similar to that of FIG. 9a, but shows higher magnification of a laser cut edge cross-section. It also illustrates effects of individual laser pulses in the upper ablation region.

The SEM images in FIGS. 9a-9c show that at the conditions used in this example, roughly 7 μm of zirconia material was removed by the laser ablation process (ablation region 110 of FIGS. 9a-9c) before the rest of zirconia electrolyte material was auto fractured by thermal stress (fractured region 112). The tensile thermal stress was generated by the temperature difference between the top and bottom surfaces of the sintered ceramic electrolyte sheet. This is in strong contrast to femtosecond laser cutting process, in which cutting is achieved by ablating all the materials and negligible thermal effect is observed. Laser micromachining (Examples 2-4) produces an auto-cleaving or auto-fracturing effect that increases the cutting speed. Edge cutting demonstrations were performed with the ns laser with repetition rates of 30 to 50 kHz and sample stage translation speeds of 25 to 40 mm/s. At 30 kHz, according to some embodiments, the average laser power incident on the electrolyte sheet was 1.7 W, and at 50 kHz the average laser power incident on the electrolyte sheet was 1.5 W. Other methods of laser micromachining defined features and creating stress to cut through fracture the electrolyte sheets are also possible. For example, fs and other laser systems, system parameters, and applied external forces can also be utilized.

FIGS. 9a-9c illustrate morphology characteristics of sintered and laser cut edges. The laser ablated portion forms the edge bevel (region 110) shown in FIG. 9b. Nanosecond laser ablation of electrolyte is accompanied by local melting (zone or region 114) with larger size crystals, as shown in FIG. 9c. In FIG. 9c individual pulse traces 116 are clearly visible. The fractured portion of the material (region 112) exhibits grainy nature. The auto-fracturing process is caused by thermal stress generated by absorption of laser light in the material.

Example 3A

We have also examined the edge surface roughness obtained as a function of cutting technique. Besides differences in the edge shape depending on cutting method as described in Example 2, differences in roughness of the edge face also exist. To observe these differences, edges cut under various conditions were evaluated using an optical interferometer. The roughness of each edge face was measured over an area of 0.09 mm×0.01 mm. These areas were selected to avoid the beveled corner (region 110) similar to that described in Example 2 and shown in FIGS. 9a-9c that otherwise would have resulted in missing back-reflected data. Edge faces created by laser micromachining sintered electrolyte with the fs laser (described in below as alternate laser configuration) and ns laser (described in Example 2) were evaluated. Also edges created by mechanically cutting and CO$_2$ laser cutting un-sintered electrolyte were evaluated after they were sintered. All data points presented are values averaged over 4 measurements from the same edge face.

Figure 10A:
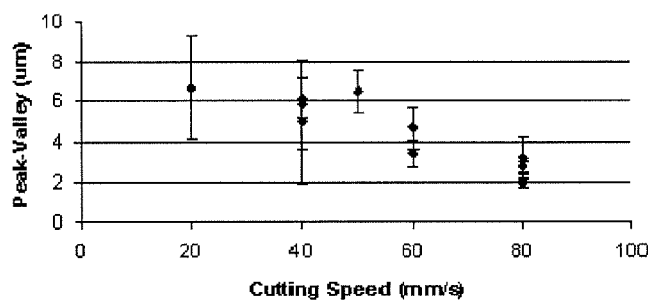
FIGS. 10a-10c are plots of edge surface roughness of exemplary electrolyte sheet edges micromachined by a ns laser.
Figure 10B:
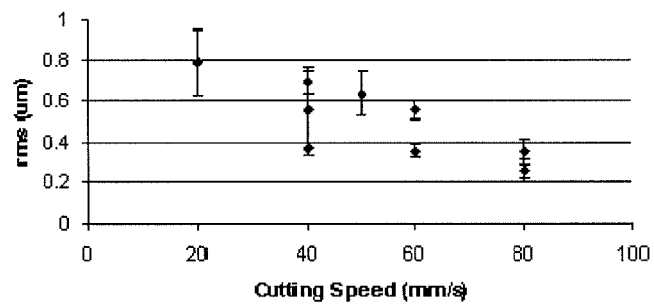
Figure 10C:
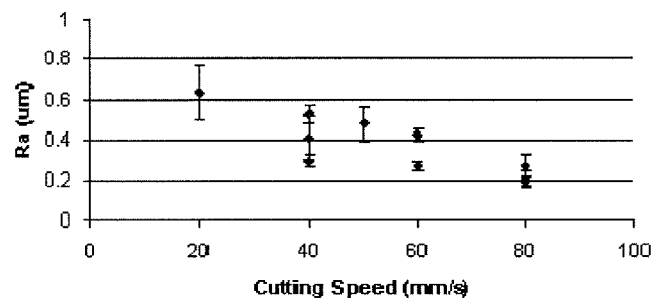
Figure 11A:
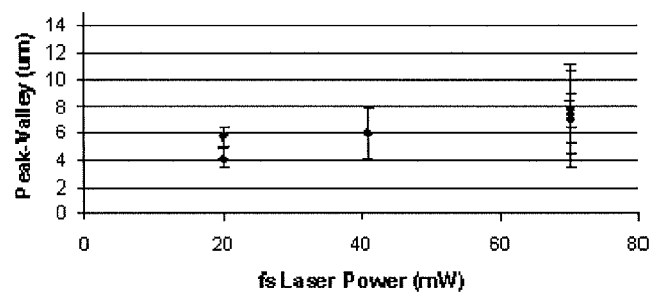
FIGS. 11a-11c are plots of edge surface roughness of exemplary electrolyte sheet edges micromachined by a ns laser.
Figure 11B:
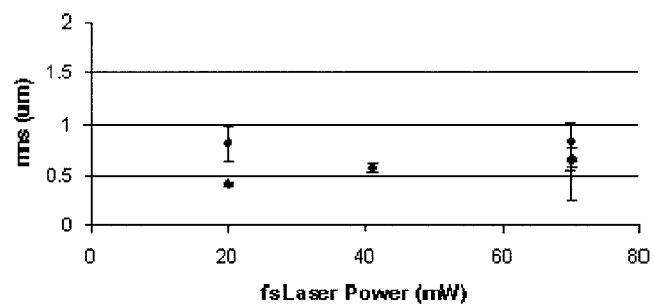
Figure 11C:
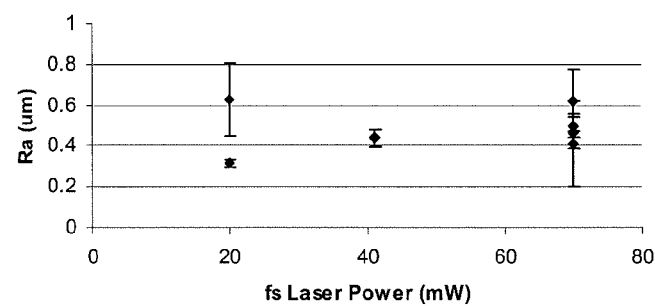

FIGS. 10a-10c show the peak-valley, rms, and Ra roughness values for the ns (266 nm) laser cut edge surface as a function of cutting speed. These figures illustrate that the faster cutting processes result in lower edge surface roughness. By adjusting the cutting speed, roughness values of less than 5.5 μm (peak-valley), less than 0.4 μm (rms), and less than 0.3 μm (Ra) can be achieved. FIGS. 11a-11c show the edge surface roughness values obtained on fs laser cut samples. FIGS. 11a-11c display surface roughness data as a function of the laser power. FIG. 11a shows that the peak-valley roughness decreases as the laser power decreases. These values are typically higher than the ns laser edge face roughness values due to the ablation caused by the fs laser. The auto-cleaving or auto-fracturing process created by the ns laser cutting creates a smoother edge surface than that achieved by mechanical cutting.

For comparison purposes, green electrolyte sheets were cut with (i) CO$_2$ laser (10-6 μm) and (ii) mechanically with a knife edge, and then sintered. The electrolyte samples cut within CO$_2$ laser in the un-sintered state and then sintered had average edge surface roughness values as low as: 13.04±1.21 μm (peak-valley), 2.52±0.17 μm (rms), and 1.90±0.07 μm (Ra). Samples that were mechanically cut in the un-sintered state and then sintered had average edge surface roughness values as low as: 5.63±0.79 um (peak-valley), 0.43±0.18 μm (rms), and 0.32±0.15 μm (Ra).

The cutting method described above yields an electrolyte sheet with an edge surface exhibiting greater than 10% ablation (see, for example, region 110 shown in FIGS. 9a-9c). Preferably the edge surface exhibits between 50% and 90% fracture (FIGS. 9a-9c, region 112). The area of fracture 112 is clearly differentiated from the area of ablation or melting 110 (see FIG. 9c) in that the fracture surface is straight, relatively flat, and perpendicular to the primary surface of the electrolyte sheet as compared to the ablated or melted surface that is more rounded and not perpendicular to the surface of the electrolyte sheet. Less preferred is an edge showing partial melting of the electrolyte surface. Also preferred is a device with an edge showing less than 20% of the circumference exhibiting fracture that deviates by more than 100 microns (i.e. less than 20% is deviated by more than 100 μm) from the ablated path of the laser. Deviation from this path is a mis-cut and represents a flaw in the finished electrolyte sheet or fuel cell device. Improper laser power, repetition rate, or speed are primary causes of this deviation.

Example 3B

This example demonstrates laser ablation related re-deposition. Referring to the optical microscope images of FIGS. 6a and 6b described above, the re-deposition area 108 around the laser machined via hole is observed. The via hole was achieved by laser percussion drilling with a 266 nm Nd:YAG laser with a 10 ns pulse duration and a laser fluence of 17 J/cm$^2$ described in ns laser configuration #1. The characteristics of this re-deposition area can be controlled by varying the laser exposure conditions (wavelength, pulse duration, pulse energy, cutting speed, repetition rate), as well as sample temperature, and purge gas and/or vacuum (e.g., their presence or absence, amount of vacuum applied, amount and composition of purge gas), or other parameters.

Figure 12A:
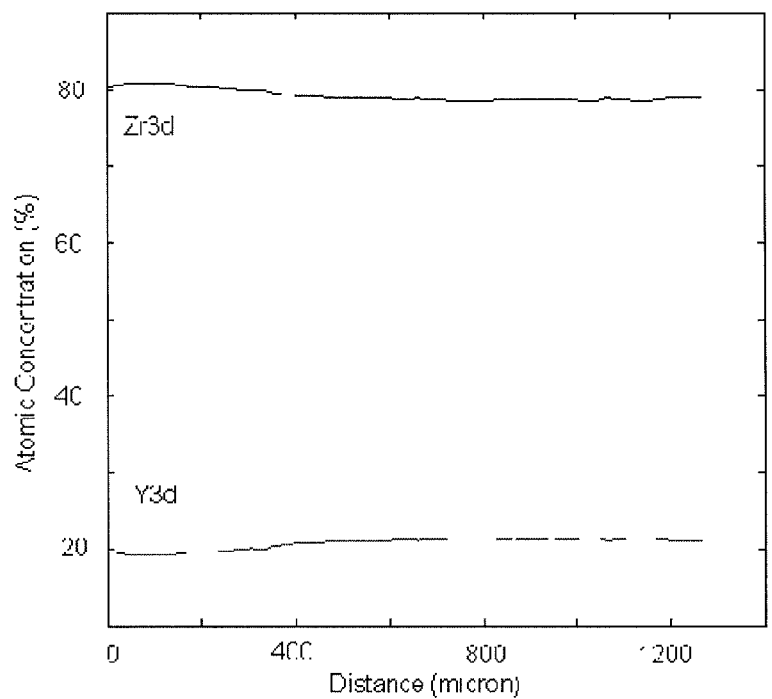
FIGS. 12a and 12b are XPS line profiles showing change in relative yttrium and zirconium concentrations.
Figure 12B:
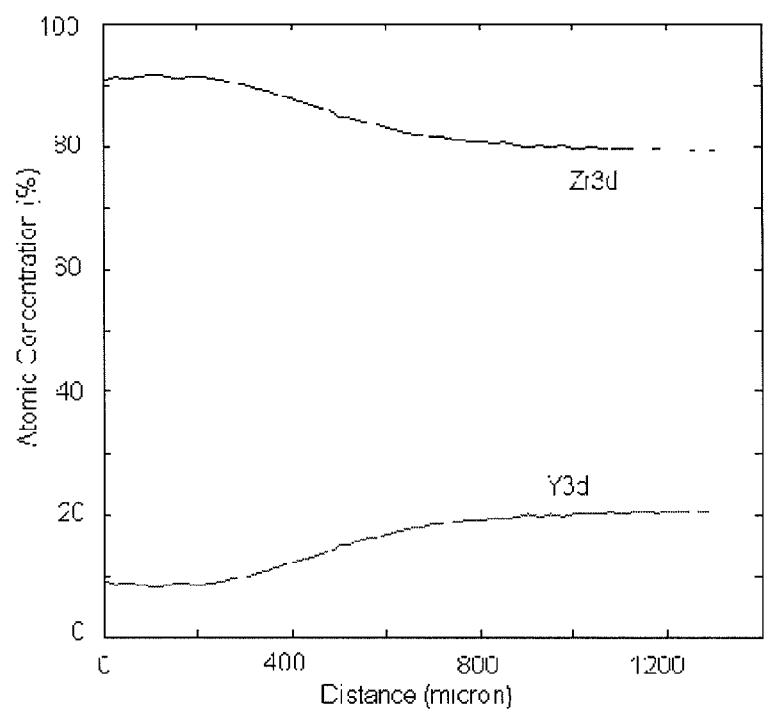

To gain more information on the re-deposition zone, an XPS (X-ray Photoelectron Spectroscopy) analysis was performed. Edges that were mechanically cut in the green state and then sintered as well as edges cut with a ns laser after sintering were both evaluated. Specifically the described ns laser configuration #2 (frequency-quadrupled Nd:YVO$_4$ laser, Spectra-Physics HIPPO-266QW) was used to create the laser machined edge at a cutting speed of 35 mm/s. FIGS. 12a and 12b shows the XPS line profile data of the relative yttrium and zirconium concentrations at the sample surface as a function of the distance from the edge. FIG. 12a shows that the zirconium level remains at a relative level of approximately 80% and the yttrium level is at a relative level of approximately 20% within 1200 μm of the mechanically cut and sintered edge. FIG. 12b shows XPS data from the same sample but from an edge that was laser micromachined. This shows that the zirconium relative level is approximately 90% and the yttrium relative level is approximately 10% within 200 μm of the laser machined edge. About 1000 μm from the laser machined edge, though, these levels transition into those observed at the mechanically cut edge. The re-deposited material observed near the laser micromachined edge has a higher zirconium-to-yttrium concentration ratio.

Examples 4A-4F

The laser micromachining system configuration for cutting and/or drilling holes in sintered ceramic electrolyte sheets 100 used in Example 4A-4F is similar to that of Examples 2, 3A and 3B (shown in FIG. 8). However, the laser micromachining system of Examples 4A-4F utilizes frequency-tripled Nd:YVO$_4$ laser 160 with an output wavelength of 355 nm. Such a laser is available, for example, from Coherent, Inc. (e.g., COHERENT AVIA-X). The laser micromachining system of Examples 4A-4F also includes plurality of mirrors M$_i$ that direct the laser beam to a galvo-scanner/f-θ lens. The galvo-scanner/f-θ lens is centered on axis Z, perpendicular to the XY stage S$_1$. (The galvo-scanner/f-θ lens is denoted as lens L$_1$, which in this embodiment is Scanlab HurryScan 10 scanner with a 100 mm focal length telecentric lens). During the laser micromachining process, the sintered electrolyte sheet 100 was supported by a movable XY stage S$_1$, and the lens L$_1$ directed the focused laser beam onto the electrolyte sheet 100. The electrolyte sheet 100 was substantially similar in composition and thickness as that described in US patent application 2004/0265663. The Nd:YVO$_4$ laser 160 has a M$^2$ value (M$^2$ is beam quality factor) of less than 1.3 and an output diameter of 3.5 mm. In some experiments an optional 3× beam expander (BE) was used to expand the laser beam provided by the laser 160. The nominal 1/e$^2$ beam diameter of the expanded beam was 10.5 mm. In these exemplary embodiments the entrance aperture of the galvo scanner is 10 mm, so some clipping of the beam exists. The 1/e$^2$ focal spot size of the laser beam on the electrolyte sheet 100 was about 6.1 μm. Unless mentioned otherwise, the laser power and consequently laser pulse energy is measured on the electrolyte sheet surface.

More specifically, the thin, sintered zirconia based electrolyte sheets 100 were laid flat on the XY stage S$_1$. The electrolyte sheets 100 were produced by a powder, slip, tape casting and sintering processes. These process produce electrolyte sheets 100 with one side appearing shinier than the other which was the sid. The shiny side of the electrolyte sheet is the side of the sheet that touched the tape casting carrier film. Unless specified otherwise, laser cutting and drilling with the micromachining system of Examples 4A-4F were carried out with laser light incident on the shiny side. Optimal focusing is achieved by adjusting the distance along the z-axis. Cutting is achieved by translating the electrolyte material with the XY stage. Drilling of via holes was carried out using the scanner (i.e., by moving the focused laser beam relative to the electrolyte sheet).

Laser Cutting of Sintered Electrolyte Sheets

Example 4A: In the laser micromachining system of Example 4a, a 3× optional beam expander was utilized to expand the laser beam provided by the Nd:YVO$_4$ laser 160. In this exemplary embodiment, laser beam pulse energy was 102 μJ and laser pulse repetition rate was 50 kHz. The incident laser power on the electrolyte sheets was 5.1 W. The laser beam was linearly polarized with polarization vector at about 75° relative to the cutting direction. A cutting speed of 160 mm/s was achieved with clean separation of the electrolyte sheet pieces. The laser fluence level on the sintered (ceramic) electrolyte material was about 350 J/cm$^2$. This fluence level is above the laser ablation threshold at the 355 nm wavelength. A total of 21 electrolyte sheet specimens with a dimension of 2 cm×8 cm were prepared by cutting sintered electrolyte sheets with the laser micromachining system of Example 4A and subsequently strength tested using the 2-point bending method. The test results are described later on in the specification.

Example 4B: In the laser micromachining system of Example 4B, a 3× optional beam expander was used to expand the laser beam provided by the Nd:YVO$_4$ laser 160. In this exemplary embodiment, laser pulse energy was 95 μJ and pulse repetition rate was 50 kHz. The incident laser power on the electrolyte sheets was 4.8 W. The laser beam was linearly polarized with polarization vector at about 75° relative to cutting direction. A cutting speed of 120 mm/s was achieved with clean separation of the electrolyte sheet pieces. The laser fluence level on the material was roughly 330 J/cm$^2$. The fluence level is above the laser ablation threshold at the 355 nm wavelength. A total of 29 electrolyte sheet specimens with a dimension of 2 cm×8 cm were prepared by cutting sintered electrolyte sheets with the laser micromachining system of Example 4B and subsequently strength tested using the 2-point bending method. The test results are described later on in the specification.

Example 4C: In the laser micromachining system of Example 4C, a 3× optional beam expander was used to expand the laser beam provided by the Nd:YVO$_4$ laser 160. In this exemplary embodiment, laser pulse energy was 21 μJ and pulse repetition rate was 125 kHz. Thus, the pulse energy in this embodiment is about 5 times lower and the pulse repletion rate was about 2.5 times higher than that of Examples 4A and 4B. The incident laser power on the sintered electrolyte sheets was 2.6 W. Laser beam was circularly polarized using a quarter-wave plate. A cutting speed of 100 mm/s was achieved with clean separation of the electrolyte sheet pieces. The laser light fluence level on the sintered electrolyte sheet material was about 73 J/cm$^2$. The fluence level is above the laser ablation threshold at the 355 nm wavelength. A total of 17 electrolyte sheet specimens with a dimension of 2 cm×8 cm were prepared by cutting sintered electrolyte sheets with the laser micromachining system of Example 4C and subsequently strength tested using the 2-point bending method. The test results are described later on in the specification.

Example 4D: The laser micromachining system of Example 4D utilized an unexpanded 355 nm laser beam to cut electrolyte sheets (i.e., no beam expander is utilized). In this exemplary embodiment, the laser beam diameter at the focusing lens was estimated to be about 4 mm. Laser cutting of sintered electrolyte sheets was performed with laser pulse energy of 194 µJ (on the electrolyte material) and repetition rate of 50 kHz. Thus, the pulse energy provided by the laser of Example 4D was higher than that provided by the lasers of Examples 4A-4C. The laser beam was circularly polarized using a quarter-wave plate. A cutting speed of 260 mm/s was achieved with clean separation of the electrolyte pieces. The laser fluence level on the material was estimated to be 108 J/cm$^2$. A total of 26 electrolyte sheet specimens with a dimension of 2 cm×8 cm were prepared by cutting sintered elect and subsequently strength tested using the 2-point bending method. The test results are described later on in the specification.

Separately 20 control 2 cm×8 cm electrolyte sheet specimens with were mechanically cut form the "green" sheet then sintered. They were also tested using the 2-point bending method.

Figure 13A:
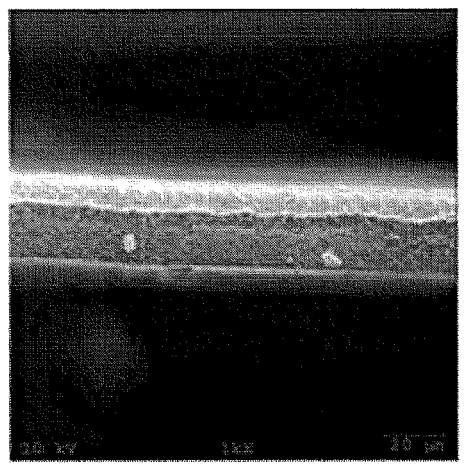
FIGS. 13a-13c are SEM images of a laser cut edge of an exemplary sintered electrolyte sheet.
Figure 13B:
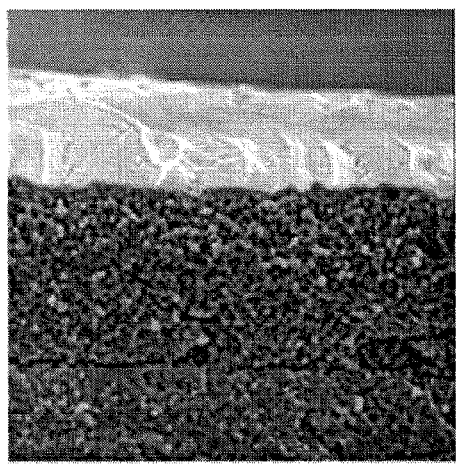
Figure 13C:
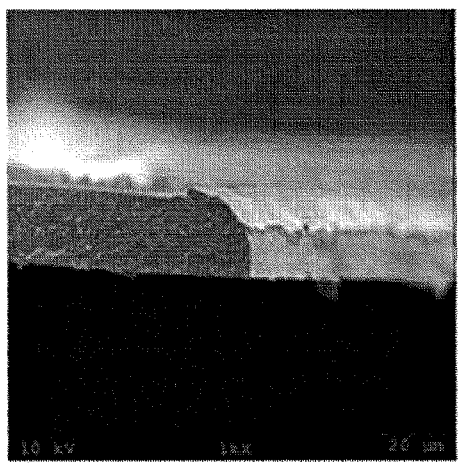

FIGS. 13a-13c illustrate an edge face of a laser cut surface of the electrolyte sheet sample prepared using the laser micromachining system of Example 4A. FIG. 13a shows the cross-section of the micromachined edge face of the laser micromachined surface. FIG. 13b shows the cross-section of the micromachined edge face surface at a higher magnification. FIG. 13c illustrates the edge profile of a laser cut edge (receding away from the picture). The scribed depth (the depth of the laser cut groove) was about 8 µm. FIGS. 13a-13c illustrate that some deposition as well as melted material is present along the laser cut edge.

Figure 14A:
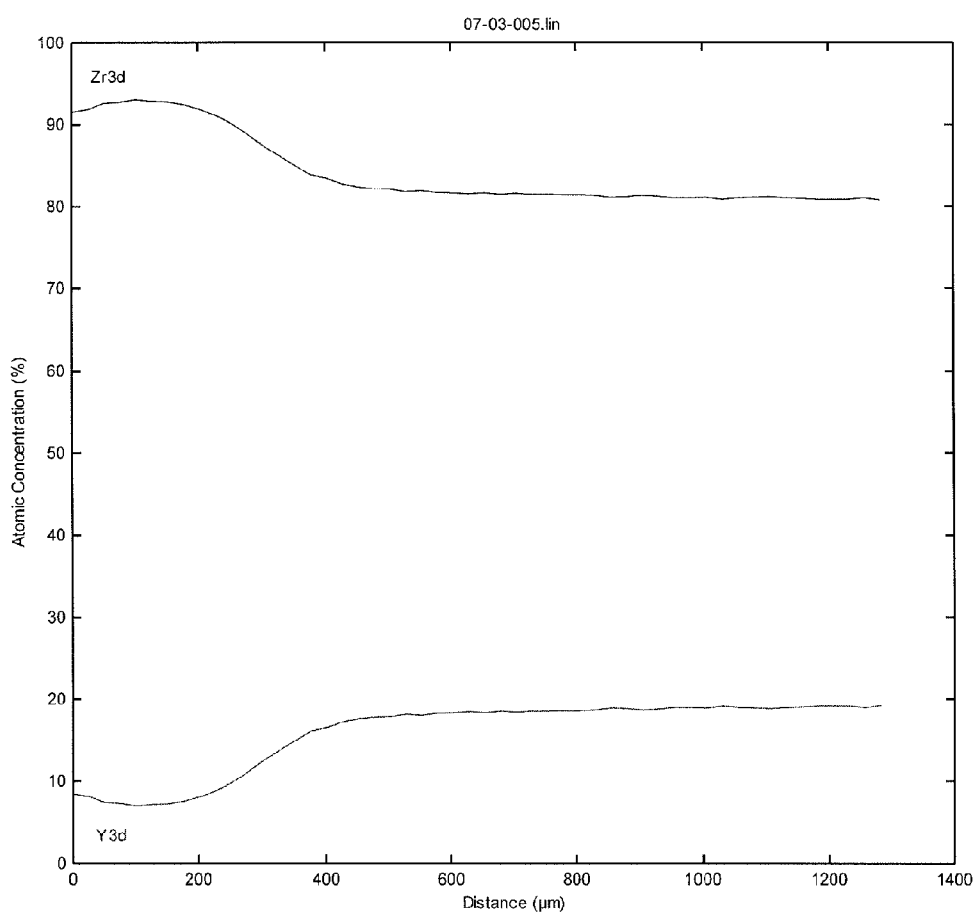
FIGS. 14a and 14b are XPS line profile showing change in relative yttrium and zirconium concentrations.
Figure 14B:
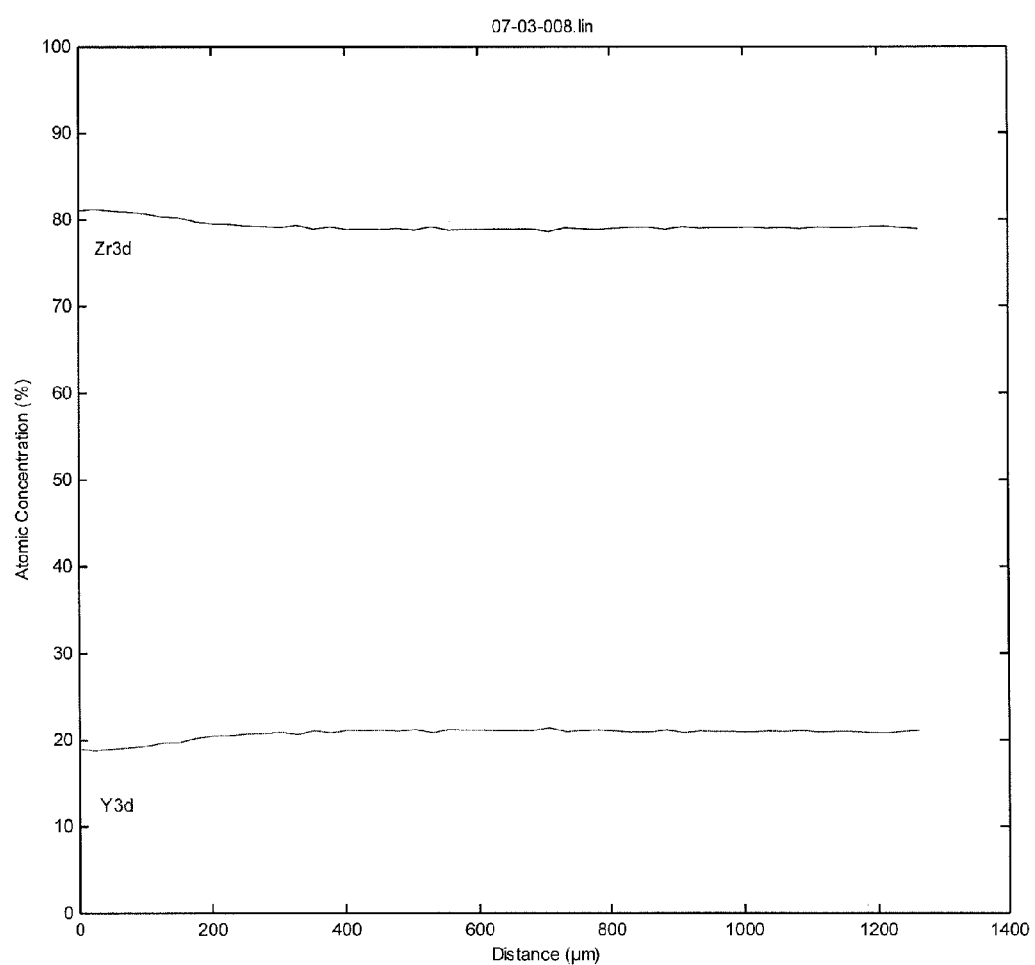

FIG. 14a is an XPS profile showing the change in relative yttrium and zirconium concentrations as a function of distance from the laser cut edge produced by the micromachining laser system of Example 4a. The line profiles for laser-cut edge (FIG. 14a) show that the relative Zr:Y ratio changes from a value of about 92:8 at the edge to a value of about 80:20 toward the center of the electrolyte sheet sample. In contrast, line profiles as a function of distance from mechanically cut edges (FIG. 14b) of a control sample (cut in a green state, than sintered) show only a small amount of change in Zr:Y ratio which is about 80:20 across the distance from the edge of the sintered sample.

Figure 15A:
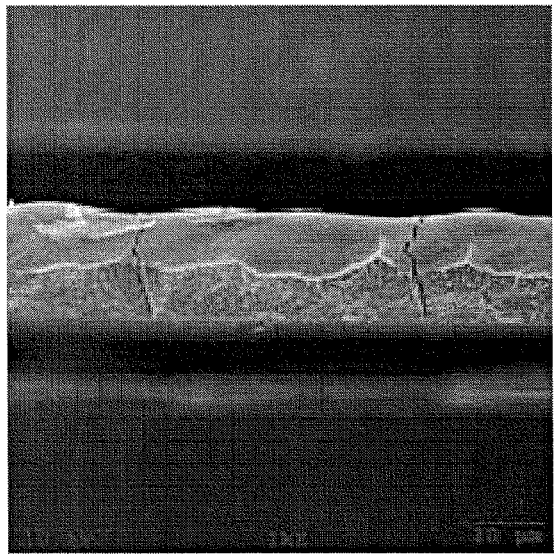
FIGS. 15a-15c are SEM images of a laser cut edge of an exemplary sintered electrolyte sheet.
Figure 15B:
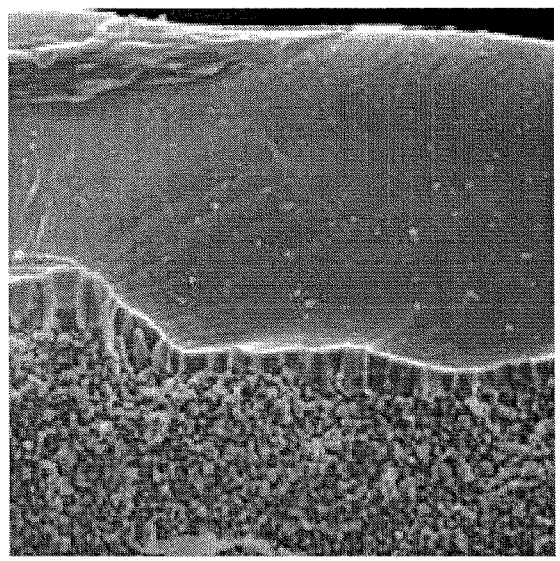
Figure 15C:
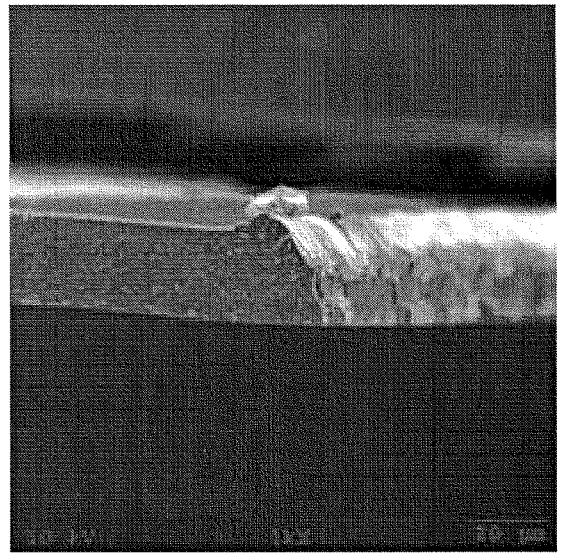

FIGS. 15a-15c show SEM (scanning electron microscope) images of laser cut edges produced by the laser micromachining system of Example 4C. In this example, according to the SEM images, the laser scribe depth was about 13 µm or about 50% through the material thickness. Because incident laser power was only 2.6 W, the resulted tensile stress produced by laser beam heating was relatively small. Hence the electrolyte sheet material was scribed to a deeper depth than that of Examples 4a and 4b, in order to enable the scribed electrolyte sheet to separate or split by controlled fracture technique. In this example, the amount of laser ablation resulted in stress buildup, which in turn resulted in cracks running across the electrolyte edge face. These cracks can be detrimental to edge strength, and therefore are not desired. FIG. 15b also shows the columnar grain growth G (about 3 µm, vertically) that resulted from laser micromachining under these conditions.

Figure 16A:
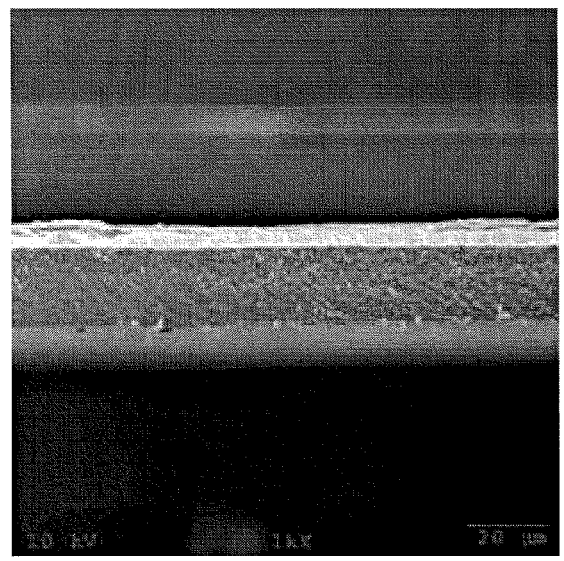
FIGS. 16a-16c are SEM images of a laser cut edge of an exemplary sintered electrolyte sheet.
Figure 16B:
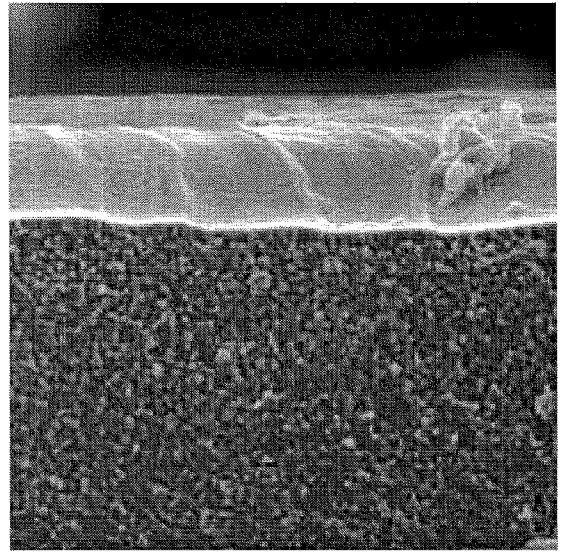
Figure 16C:
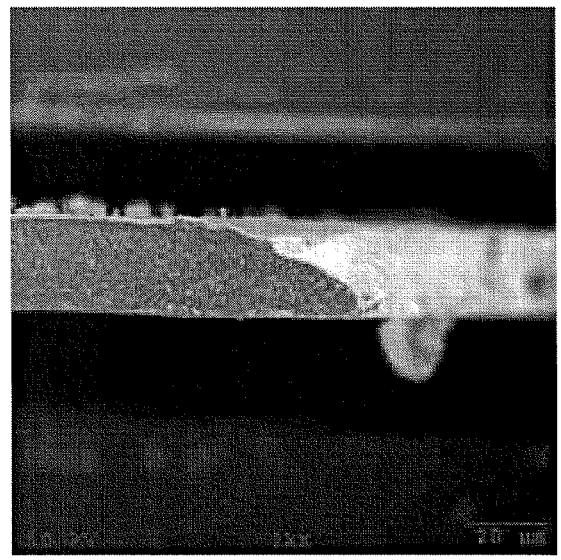

FIGS. 16a-16c illustrate the edge face of a laser cut electrolyte sheet piece that was produced by the laser micromachining system of Example 4D. The scribe depth (laser beam produced groove) was about 6 µm or about 23% of the total electrolyte sheet thickness. Columnar crystal growth of less than 0.5 µm in length was observed at the boundary between the melted layer and the unaffected material. The fractured edge is very smooth and no crack formation was observed.

Figure 17:
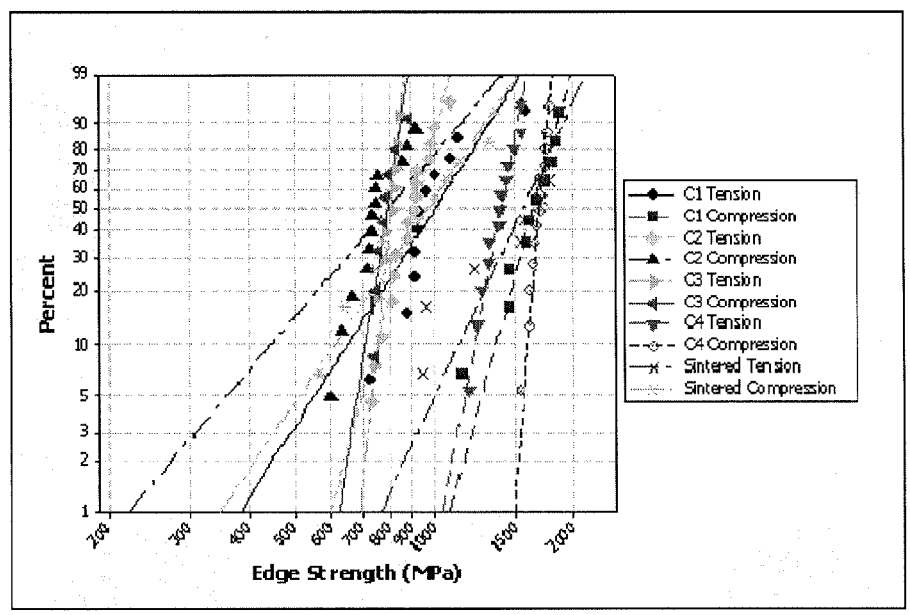
FIG. 17 shows probability plots of edge strength showing Weibull distributions for mechanically cut and laser micromachined electrolyte samples, measured by 2-point bending.

Applicants strength tested, using the 2-point bending method, all laser cut electrolyte sheet specimens produced by the laser micromachining systems of Examples 4A-4D. With respect to the laser incident surface, the cut specimens were tested with this laser incident surface both in tension and under compression with different sample sets. The resultant edge strength data was plotted via a Weibull Distribution as shown in FIG. 17. More specifically, FIG. 17 shows plots of edge strength (MPa) vs. probability (percent) of failure. The laser micromachining system conditions of Example 4D produced the highest strength values and lowest probability (measured in %) of failure. The strength data labeled C1 corresponds to the electrolyte sheet specimens produced by the micromachining systems of Example 4A; C2 corresponds to the electrolyte sheet specimens produced by the micromachining systems of Example 4B; C3 corresponds to the electrolyte sheet specimens produced by the micromachining systems of Example 4C; C4 corresponds to the electrolyte sheet specimens produced by the micromachining systems of Example 4D, and the last two "sintered" data sets correspond to the measurements (shiny side under tension and shiny side under compression, respectively) of control samples (mechanically cut in the green state.) When the laser cut test samples were put in tension, the laser micromachining system of Example 4D (i.e., the system without the beam expander) had the highest mean value of 1390 MPa. The laser micromachining system of Example 4C (with the beam expander in place) yielded the lowest mean value of 805 MPa. For the edge strength results for the laser cut test samples placed under compression, the electrolyte sheet samples cut with the laser micromachining system of Example 4D, yielded the high mean value of 1698 MPa. The laser cut test samples produced by the laser micromachining system of Example 4C (Beam Expander in place), under compression, yielded lower mean value of 790 MPa. The laser micromachining system of Example 4D is preferred since both the tensile and compressive strength of the laser cut edges produced by this system conditions is comparatively high.

The strength of laser cut specimens with the laser incident side under compression (with the exception of those cut with the laser micromachining system of Example 4C) was better than with the laser incident side under tensile stresses. This can be explained by the adverse effects of melting and heat-affected-zone around the laser ablated groove which acts as fracture initiator. Placing the shiny electrolyte side in compressive stresses for electrolyte specimens that were mechanically cut in a green state produced lower strength than placing the shiny side under tensile stress. This is because of edge curl formed during the sintering process on the mechanically cut samples. This edge curl is removed for the laser micromachined samples during the laser cutting after sintering, so the edge curl does not adversely affect the strength.

Laser Drilling of Via Holes on Sintered Electrolyte Sheets

Thermal effects need to be controlled and minimized during hole drilling of thin ceramic sheets (e.g., zirconia based electrolyte sheets) in order to avoid microcracking. Preferably, this is done by minimizing the amount of power incident on the material, in order to decrease the level of transient stress. The following examples show some of the exemplary conditions which result in no microcracking around the perimeter of the hole.

Via holes can be drilled in sintered electrolyte sheets by using a trepanning technique. The thermal effects during the laser drilling process need to be carefully controlled (as described below for example through pulse patterning) in order to avoid cracking of the material due to thermal expansion. As such via hole drilling is typically performed over multiple passes around the desired profile. Multi-pass drilling techniques can reduce the amount of thermal gradient buildup in the drilling process, thus avoiding micro-crack formation during the process In order to avoid cracking of the electrolyte sheets, the laser power preferably is reduced. Since the laser power is a product of laser pulse energy and laser pulse repetition rate, this could be achieved by reducing either the pulse energy or the laser repetition rate. In addition, the scanning speed of the laser beam needs to be adjusted correspondingly based on thermo diffusion considerations.

Figure 18A:
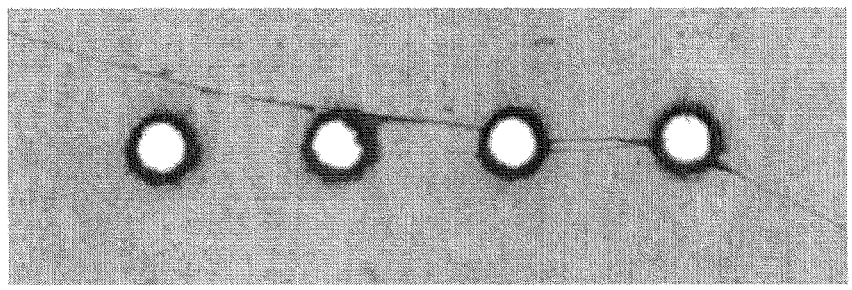
FIGS. 18a through 18c are optical microscope images of exemplary via holes drilled through sintered electrolyte sheets.
Figure 18B:
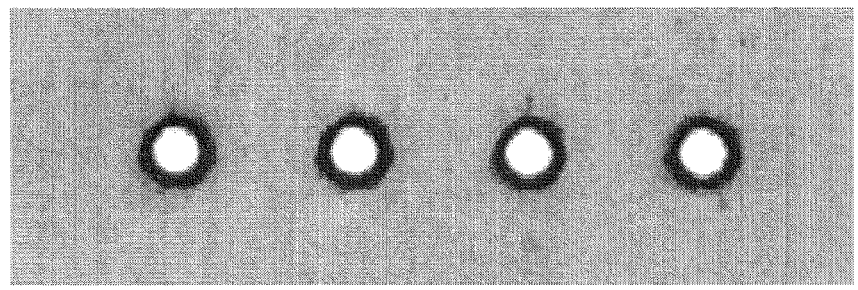
Figure 18C:
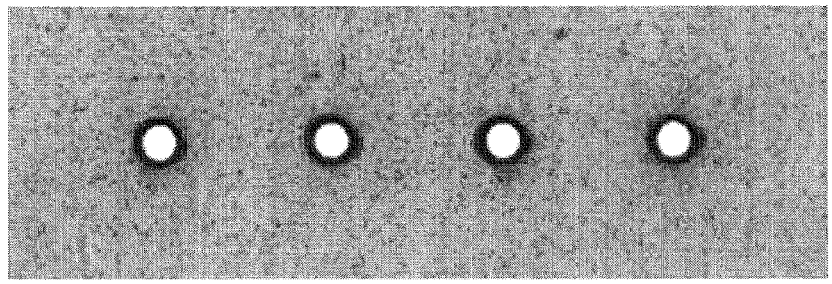

Since observation of micro-crack at a single via requires high power optical microscopes or SEMs, an alternative technique of evaluating a drilling recipe is to drill a series of holes spaced closely together and observe whether crack forms between the holes. FIG. 18a and FIG. 18b are two optical images of 4 holes of 60 um in diameter, spaced 250 um apart. Laser pulse energy of 180 uJ was used and approximately 25 passes were needed to drill through the material. Initially at laser repetition rate of higher than about 3 KHz and scanning speed of higher than 60 mm/s, cracks along the holes were observed. FIG. 18a is an optical image of the holes and the cracks running along the direction of holes. The conditions used were: a laser repetition rate of 4 KHz, a scanning speed of 80 mm/s. As the laser repetition rate and scanning speed is reduced, cracks no longer form along the chain of via holes. This is shown in FIG. 18b. The conditions were: a laser repetition rate of 3 KHz, a scanning speed of 60 mm/s. Further analysis with SEM images of individual holes also showed no observable radial cracks along the perimeter of the holes The above working example uses a low repetition rate to reduce thermal effects. In FIG. 18c is shown an example using low laser pulse energy. This shows an optical image of via holes drilled under conditions of 21 uJ, a laser repetition rate of 15.04 kHz and a scanning speed of 600 mm/s. A total of 40 passes were performed to drill through the material.

Figure 19:
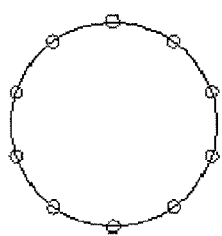
FIG. 19 Illustrates laser pulse patterns utilized in a multi-pass drilling approach.
Figure 19:
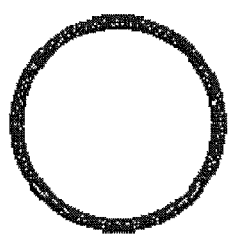
Figure 19:
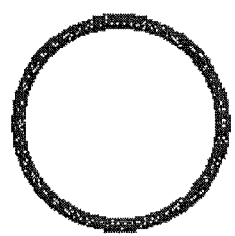
Figure 19:
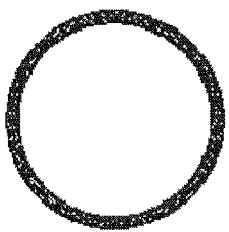
Figure 19:
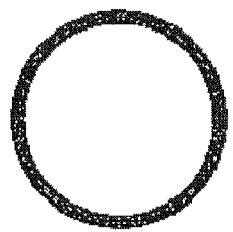
Figure 19:

In order to obtain holes with smooth edges, it is important to consider how pulses overlap between different passes. This is important when the via hole diameter is considerably larger than the laser beam diameter at the focus. In the following example, pulse patterns of a 60 um via hole drilled with multi-pass trepanning technique are analyzed. Experimentally it was found that with a speed of 60 mm/s and a laser repetition rate of roughly 3 kHz, it takes roughly 25 passes to drill through the electrolyte material. The number of pulses per pass is roughly 10. In FIG. 19 shows pulse patterns as a function of number of pulses per pass. The numbers of pulses per pass are: a) 10+0/25; b) 10+1/25; c) 10+2/25; d) 10+3/25; e) 10+4/25; and f) 10+5/25. Clearly patterns shown in FIG. 19b through FIG. 19e give smooth edges since the pulses were spread evenly around the perimeter, whereas FIG. 19a and FIG. 19f result in a hole with rougher edges. In general, knowing the number of passes P, the best drill pattern with the smoothest edge is obtained when the fractional pulse per pass is i/P, where Pi is not an integer, 0<i<P (i/P is a fraction that could be reduced or that i and P do not share a common factor). The number of pulses per pass could be optimized either by change the scanning speed or laser repetition rate slightly.

Figure 20A:
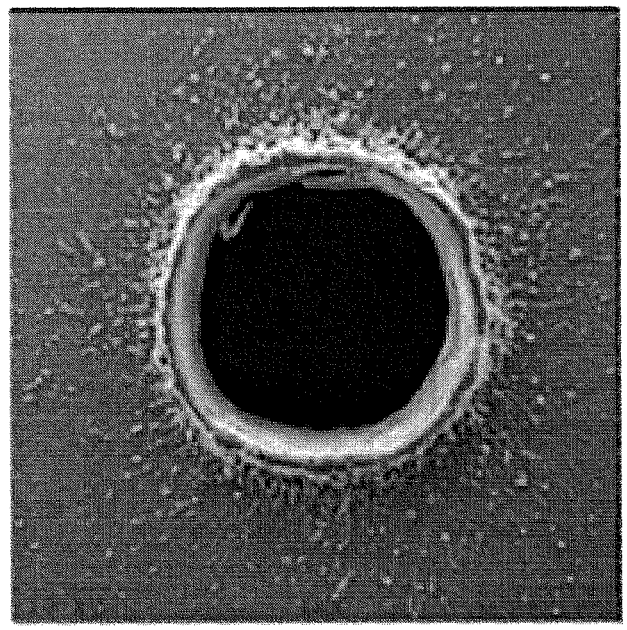
FIGS. 20a and 20b are photographs of an exemplary laser micromachined via hole in a sintered electrolyte sheet.
Figure 20B:
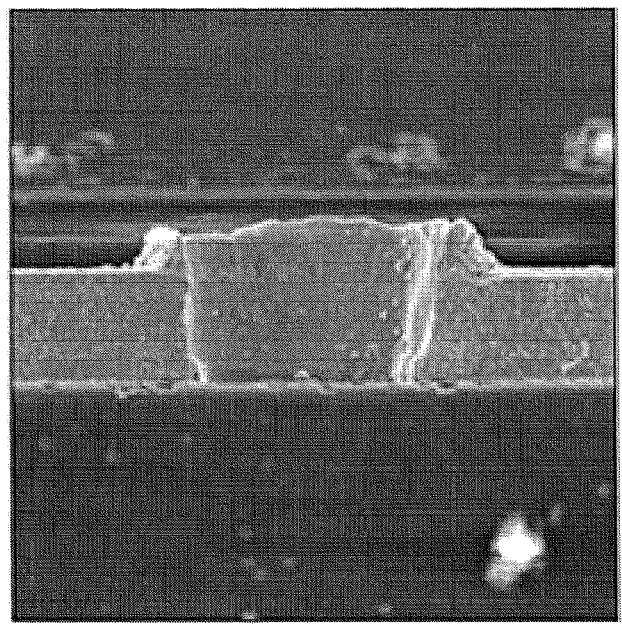

Example 4E: The laser micromachining system used for drilling via holes in this example is the laser micromachining system of Examples 4A-4D. A 3× beam expander was used to expand the laser beam. Laser drilling of via holes in a sintered solid oxide (zirconia based) electrolyte sheets was performed with a 355 nm frequency-tripled Nd:YVO$_4$ laser 160 providing 50 μJ pulse energy and laser repetition rate of 10 kHz. Fluence level on the ceramic electrolyte material was estimated to be 174 J/cm$^2$. Via holes were drilled by scanning the laser beam with a galvo scanner. Multi-pass trepanning with a scanning speed of 100 mm/s approach was used in this example. Approximately 10 to 20 passes were needed to ablate through the sintered electrolyte material having a thickness of about 22 μm. FIGS. 20a, 20b are SEM photographs of laser drilled via holes. FIG. 20a is a SEM image of top-view of the via hole, whereas FIG. 20b is a cross-sectional view. FIG. 20b also shows a lip L formed from the melted ceramic (zirconia based electrolyte) material around the drilled via hole. The lip height h is about 6 μm or 7 μm. No microcracks were formed at the hole periphery. The lip L may be trimmed with a laser to a height less than 5 μm, preferably less than 3 μm, more preferably less than 2 μm.

Via holes on the electrolyte sheets serve the purpose of allowing a conductor to connect cathode(s) to anode(s) through the electrolyte sheet, thus conducting current between the electrodes through the electrolyte sheet. Formation of lip around the periphery of the via hole may hinder current flow and act like a current constrictor, and otherwise create defects in subsequently formed layers of fuel cell device(s). Thus, lip formation is undesired. It is noted that lip formation was not observed or lip height was insignificant with holes drilled with nanosecond 266 nm lasers. The reason for the significant melting and lip formation in this exemplary embodiment may be due to the relatively low photon energy of the 355 nm lasers. Unlike 266 nm photons which can potentially break the chemical bonds of the zirconia material, 355 nm laser ablation is dominated by laser heating and melt evaporation mechanism. If the drilling process results in a significant lip formation, it is preferable to utilize a subsequent laser lip trimming step to minimize lip height.

Example 4F: The laser micromachining system used for drilling via holes in this example is the laser micromachining system of Example 4D. The laser micromachining system of this example did not utilize the beam expander, accordingly an unexpanded 355 nm laser beam was used in this embodiment. The laser beam diameter on the focusing lens (L$_1$) was estimated to be about 4 mm. Laser beam waist on the electrolyte sheet was approximately 20 μm. Laser pulse energy was 194 μJ and the laser fluence on the material was about 108 J/cm$^2$. A hole with a given diameter of 60 μm was drilled (laser micro machined) through the sintered electrolyte sheet after about 30 passes with a laser repetition rate of 4 kHz and a trepanning speed of 80 mm/s. Afterwards the lip was trimmed down with a laser trimming step was carried out by trepanning at a diameter of 90 um around the same central location. The trimming step which involved 2 passes at a speed of 80 mm/s with same laser parameters (same pulse energy and pulse repetition rate). The main difference between the drilling and trimming steps, were the laser path diameter(s). The purpose of the trimming step is to slightly ablate the lip formed during trepanning the through hole to a height h, where h is preferably less than 5 μm, more preferably less than 3 μm, even more preferably less than 2 μm and most preferably less than 1 μm.

Figure 21A:
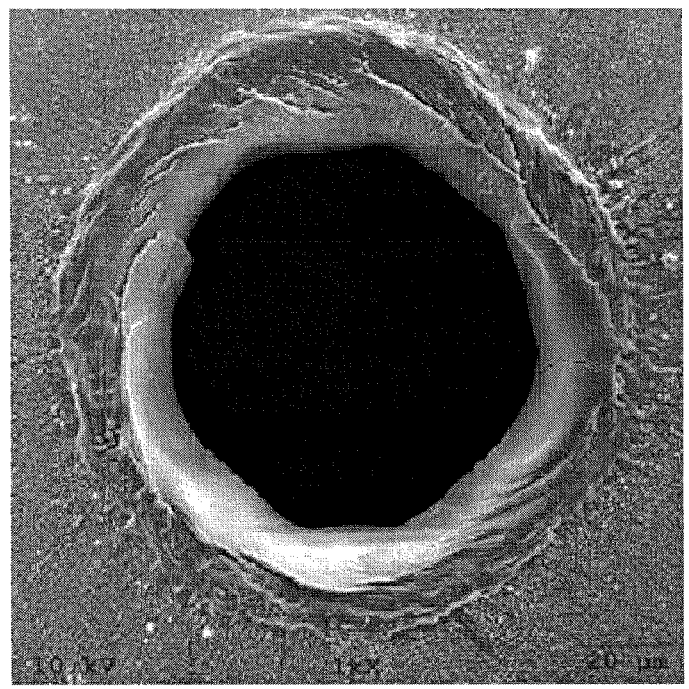
FIGS. 21a through 21f are photographs of other exemplary laser micromachined via holes in a sintered electrolyte sheet.
Figure 21B:
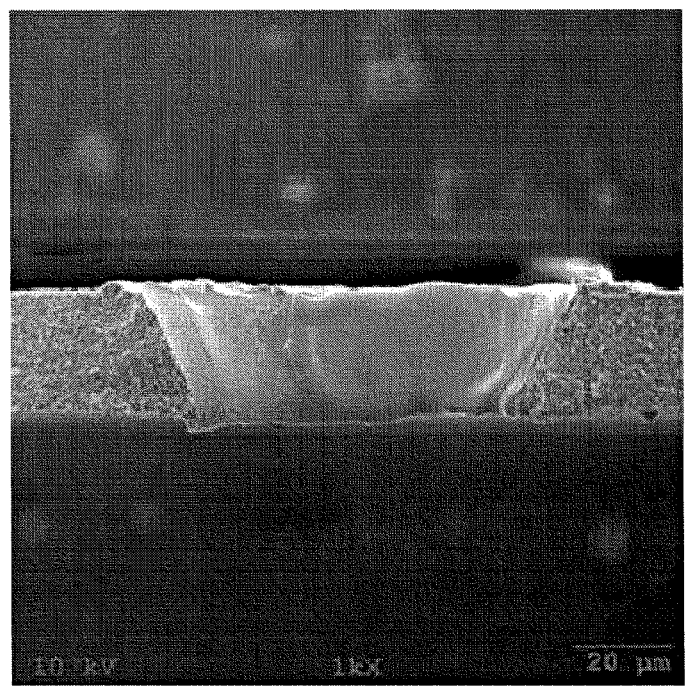

A series of 5 via holes with a diameter of 60 μm were drilled with a center-to-center spacing of 1000 μm. Again, these 60 μm diameter via holes also incorporated an edge lip trimming step with a 90 μm diameter circle (laser beam waist of about 20 μm). Also, a series of 5 via holes of the same geometry were made with a center-to-center spacing of 200 μm with the same trimming step. Finally, a series of 5 via holes with a diameter of 40 μm were formed that included an edge lip removal step with a 60 μm diameter. These were fabricated with a center-to-center spacing of 200 μm. FIGS. 21a, 21b are SEM images of via holes drilled by laser trepanning, after the associated laser trimming. FIG. 21a is a top-view of the via holes, whereas FIG. 21b is a cross-sectional view of the hole. Note the characteristic swirl pattern shown in FIG. 21a, formed by the scanning laser beam. The swirl pattern was caused by repeated heating and evaporation by the scanning laser beam of the melt pool formed by previous scans. From FIG. 21b we can see that the lip formation was minimized. Via holes with reduced lip height h such as that shown in FIG. 21b are desired for use in solid oxide fuel cell applications.

Figure 21C:
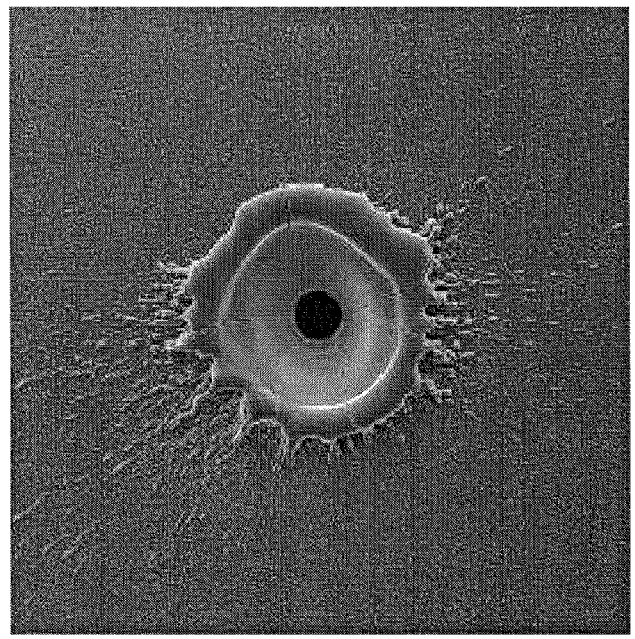
Figure 21D:
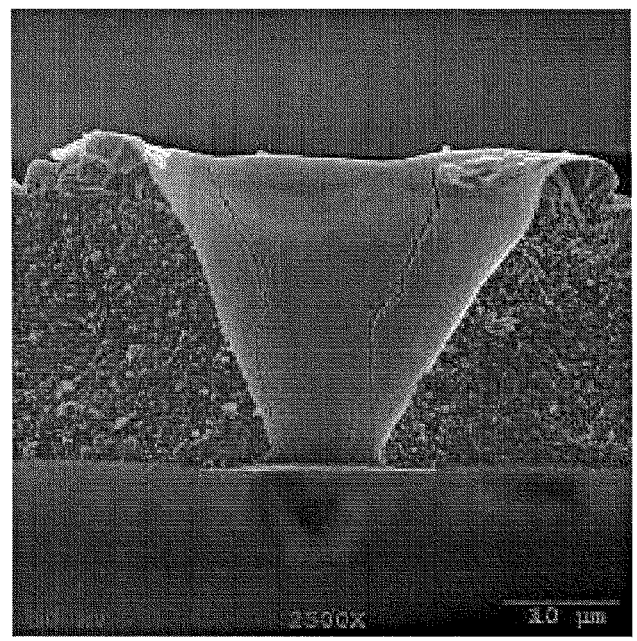
Figure 21E:
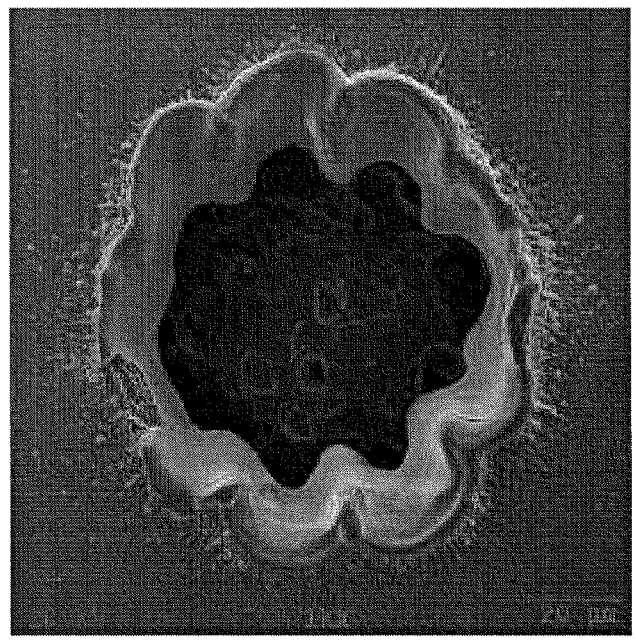
Figure 21F:
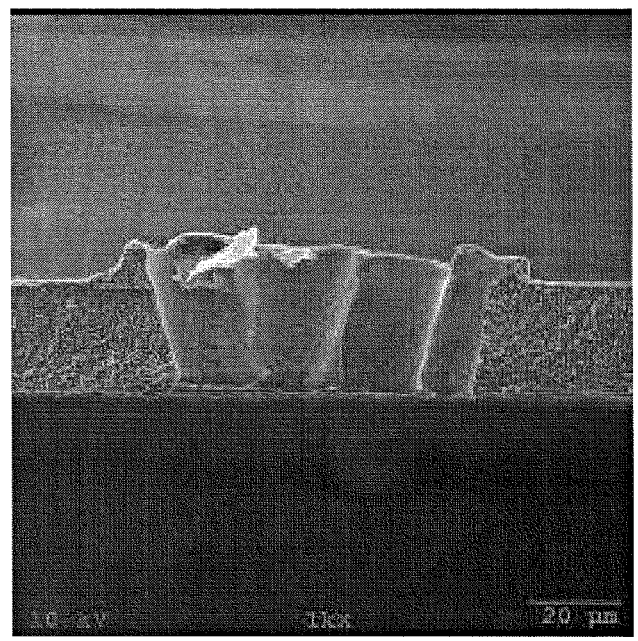

Although a laser trimming technique was used to reduce lip height in the drilled electrolyte samples of Example 4F, other techniques such as spiral drilling and percussion drilling also showed promising results. In FIGS. 21c and 21d we present SEM images of percussion drilled via holes with a diameter on the laser incident side of about 40 μm and a diameter on the laser exit side of about 10 μm. The lip height h was about 5 μm. Another method is the spiral drilling technique. FIGS. 21e and 21f show images of SEM holes drilled with spiral drilling technique. The lip height was about 9 μm, as shown in FIG. 21f Lip trimming, as discussed above, or further process improvement could lead to a decrease in lip height.

Examples Using ps Laser Configuration (Example 5)

Example 5

A picosecond laser was used to micromachine via holes on electrolyte sheets. The laser had a 10 ps pulse width, a wavelength of 355 nm and a pulse energy of 280 maximum at a repetition rate of 100 kHz. The laser was capable of a repetition rate range of 50 kHz to 2 MHz and a maximum power of 4 W. A lens with a focal length of roughly 8 cm was used to focus the light in proximity of the electrolyte sheet. The focal spot size was estimated to be roughly 50 μm. Hence the laser fluence at the focal point was roughly 1.4 J/cm². A percussion technique was used to micromachine via holes in the electrolyte material. Microcracks were observed to be present at various laser repetition rate and power combinations. Such cracks are not desired in the fuel cell device. Microcracking was not observed in the previously given UV laser micromachining examples with fluences greater than 1.5 J/cm² and will not be expected if the ps laser had provided higher fluence levels, for example fluence levels similar to those provided by other examples (ns and fs configurations).

Examples Using fs Laser Configuration (Examples 6 to 9)

In this configuration, an amplified fs laser system (1W Spectra Physics Spitfire® Pro Ultrafast Ti:Sapphire Amplifier) was used. The laser outputs a 1 kHz pulse train at a maximum energy of 1 mJ per pulse. Pulse duration is approximately 40 fs, and the laser emission is centered at a wavelength of 800 nm. A plano-convex lens with a focal length of 7.5 cm was used to focus the laser light in proximity of the electrolyte sheet. Based on the laser Gaussian beam quality $M^2$ value of 1.4, wavelength, and a beam size of 7 mm (collimated beam diameter), beam waist at the focal point was calculated to be 15 μm. Cutting trials were performed below the white light generation threshold which was found to be 35 μJ/pulse with this lens system. Other focal length lens systems are also possible such as 3.5 cm or other options. Laser cutting speeds of 0.5 to 2 mm/s were achieved without detrimental effects, but the cutting speed was ultimately limited by the laser repetition rate. No microcracks at the micromachined edge were observed.

Example 6

Micromachining can be used to reduce or eliminate effects of electrolyte wrinkling including edge wrinkling that occurs during sintering. On large electrolyte sheet pieces, for example of dimension greater than 10 cm in width or length, wrinkling of the edges and other non-planarity has been observed during the electrolyte sintering process. These effects tend to be more pronounced as the electrolyte dimension increases. Depending on the electrolyte sheet size, these effects have been observed up to 4 cm within the electrolyte sheet edges. Laser micromachining allows these large electrolyte sheet pieces to be over-sized during the sintering step. Laser micromachining can then later be used to cut off this excessive edge wrinkling, non-planarity, or any other defects that might exist after sintering or device fabrication. To demonstrate the capability of improving the electrolyte flatness with laser micromachining, the fs laser was used to remove a width of 2 mm from the electrolyte sheet edge. The edge flatness of a sintered electrolyte sheet was measured before and after micromachining. FIG. 22 shows the surface contours as measured by a laser profilometer of approximately 20 μm thick electrolyte sheet before (top graph) and after micromachining (bottom graph),—i.e., after laser cutting/removing a 2 mm wide perimeter from the electrolyte sheet edge. The electrolyte edge after sintering has a measured maximum height variation of 80 um, and the electrolyte edge has a much lower measured maximum height variation of 40 μm after laser micromachining.

Example 7

To demonstrate laser micromachining of solid oxide fuel cell devices (SOFC devices) 150, edges and vias were micromachined in a sintered electrolyte sheet 100 for both 10-cell and 1-cell devices. Both types of fuel cell devices required multiple via rows to interconnect the electrodes created on both sides of the electrolyte. Four different device fabrication scenarios were demonstrated and are disclosed below:

1. Drilling holes in mechanically trimmed, bare sintered electrolyte sheet. Bare electrolyte sheet was received that was mechanically cut and sintered (the electrolyte sheet had at least one dimension greater than 10 cm dimension, which was required for a 10-cell device). Precise alignment of edges to the via holes, as they were drilled was required. Thus, while eleven rows of via holes were laser micromachined in the electrolyte sheet using a laser trepanning technique (an example of such hole is shown in FIGS. 23a, 23b), their placement was accurately referenced to the as-formed mechanically cut electrolyte sheet edges. For trepanning, the laser beam was kept stationary and the sintered electrolyte sheet 100 was moved along a circular path. Via hole (circular) geometry was similar to that shown in FIGS. 23a and 23b. The cutting speed was limited by the low repetition rate of the laser source. From FIG. 23a and FIG. 23b we can see that the quality of the via hole 102 is very good. There remained some ring cracks 118 on the back side of the via hole 102 due to, presumably, shock waves generated during the laser ablation process. At higher average power of about 35 mW, the ring cracks can be eliminated. With a cutting speed of 0.5 mm/s, the 60 µm diameter via holes 102 were laser cut in typically 2 passes with an energy of 30 µJ/pulse and a fluence level of 17 $J/cm^2$. The 10-cell device fabrication was then completed including steps of forming the anode, cathode, current collector, via conductors, and busbar structures.

The specific sample shown in FIGS. 23a and 23b was micromachined using the fs laser but with a pulse energy of 7 µJ/pulse and a fluence level of 4 $J/cm^2$. In contrast, the actual 10-cell and 1-cell devices 150 described previously had laser micromachined via holes using the same fs laser but at 30 µJ/pulse and a fluence level of 17 $J/cm^2$. These higher pulse energies and fluence levels reduced the formation of ring cracks and only 2 passes were needed to machine a through hole with the same circular geometry. Although microcracking was observed when the fs laser fluence was 4 $J/cm^2$, the previous visible-near infrared laser micromachining examples given with fluences larger than 4 $J/cm^2$ showed no observable microcracking.

Figure 24A:
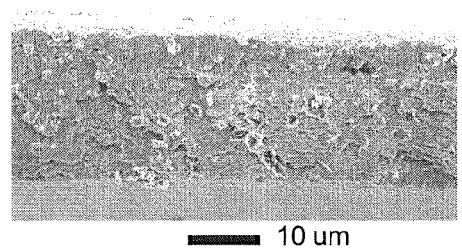
FIGS. 24a and 24b are SEM images of edges of sintered zirconia electrolyte sheets.
Figure 24B:
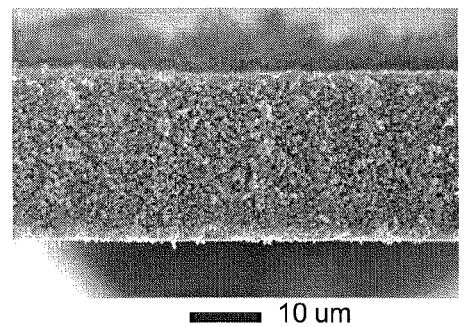

2. Laser trimming and hole drilling in sintered oversized electrolyte sheets. We received a bare sintered electrolyte sheet that was sized larger than required for a 10-cell device. In one embodiment the electrolyte sheet dimensions were 12 cm×15 cm. Both the 11 rows of via holes and the device perimeter were laser micromachined using a 800 nm laser. Since the electrolyte sheet was oversized, no precise alignment to the as-formed edges was required. Thus, only coarse alignment was needed. Approximately 1 cm to 1.5 cm was removed (micro machined) from the electrolyte sheet edges during the precision laser perimeter cutting, and the via holes were accurately aligned to the perimeter cut/micromachined edges. FIG. 24a shows SEM images of edges that were mechanically cut in the green state and then sintered, and images of edges that were sintered and then cut with the femtosecond laser (see FIG. 24b). The surface quality of the produced edge surfaces was similar to that shown in FIG. 24b. FIG. 24a shows, for comparison, a cross-section of the mechanically cut (while in the green state) and sintered electrolyte sheet. Measurements of the laser micromachined electrolyte overall length and width dimensions showed a sample-to-sample variation limited by the measurement error of less than ±0.04%. The 10-cell device fabrication was then completed including steps of forming the anode, cathode, current collector, via conduction, and busbar structures. In a prophetic example, electrolyte of 30 cm in length is produced with via holes possessing a via-to-via registration error of less than 50 microns. This example demonstrates the edge profile and morphology characteristics of sintered and laser cut edges. Sintered laser machined edges such as what is shown in FIG. 24b have a RMS roughness of about 0.4 to 0.8 µm. In case of femtosecond laser cutting of electrolytes, thermal effects were observed to be small such that the electrolyte can be cut through (ablated) without cracking. Re-crystallization of the vaporized and melted material result in crystal grain growth, similar to that shown in FIG. 24b. The crystal grain size is less than 1 µm (FIG. 24b). At the same cutting speed, increasing laser fluence will result in crystal grain growth in size.

3. Laser hole drilling for multiple devices in a sintered oversized electrolyte sheet substrate, with subsequent cutting and separation of the drilled electrolyte sheets corresponding to these devices. A large bare electrolyte sheet dimension >10 cm was mechanically cut and sintered. Multiple clusters of 2 rows of via holes, each corresponding to a 1-cell device were laser drilled/micromachined in the large electrolyte sheet and multiple sections of the electrolyte sheet, each corresponding to a different 1-cell device with a dimension ≤5 cm were laser micromachined out of the large electrolyte sheet. Thus, both the 2 rows of via holes and the electrolyte sheet perimeters corresponding to each fuel device were laser micromachined, and the vias and micromachined edges were accurately aligned to each other. The 1-cell device fabrication was then completed on each separate electrolyte sheet, including steps of forming the anode, cathode, current collector, via conduction, and busbar structures.

4. Multiple device manufacture on a single oversized electrolyte sheet A large electrolyte sheet was mechanically cut and then sintered. This electrolyte sheet had at least one dimension greater than 10 cm. Multiple anode patterns for a plurality 1-cell devices were previously printed and sintered on one surface of the received electrolyte sheet. Laser micromachining of the sintered electrolyte sheet was utilized to drill multiple sets of two rows of via holes 102 (each set corresponding to a different fuel cell device) and the perimeters of the 1-cell devices (with dimensions ≤5 cm). The laser micromachined features were accurately aligned to the previously fabricated anode layers. The resulting laser cut electrolyte sheets (corresponding to 1-cell devices) incorporated both previously fabricated anode pattern and an aligned via pattern. The 1-cell device fabrication was then completed including steps of forming the cathode, current collector, via conduction, and busbar structures.

The following is an exemplary process for manufacturing multiple sold oxide fuel cell device on a single oversize zirconia based electrolyte sheet:
  a. Sintering a green electrolyte sheet (T≈1450° C.);
  b. Printing anodes and other layers as needed and sinter (T≈350° C.);
  c. Laser drilling via holes;
  d. Filling via holes with conductive via material and sintering (T≈1250° C.);
  e. Printing other layers (e.g., cathodes), and sintering (T≈1200° C.);
  f. Printing bus bars, etc and sintering (T≈750-1000° C.);
  g. Cutting out each (at least partially completed) fuel cell device by laser micromachining after the last sintering step.

It is noted that the manufacturing starts with higher sintering temperatures and proceeds to progressively lower sintering temperatures.

Example 8

Figure 25:
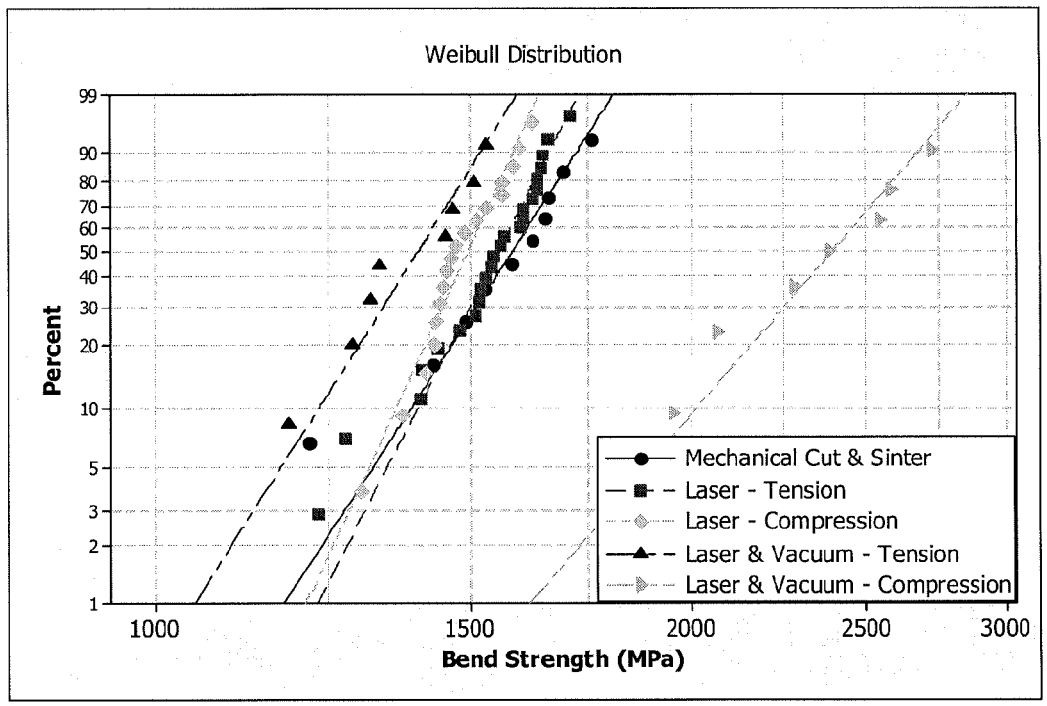
FIG. 25 shows probability plots of strength showing Weibull distributions for mechanically cut and laser micromachined electrolyte measured by 2-point bending.

Edge strength of zirconia electrolyte is of great importance in some applications. To demonstrate the strength obtained from the laser micromachined edges, 2-point bend tests between parallel plates were performed with electrolyte samples approximately 2 cm×8 cm. The strength of mechanically cut and sintered samples was measured as a reference. The mechanically cut samples were measured with the smoother surface that was cast against the Teflon carrier experiencing tensile stress. The samples with the micromachined edges were tested with the laser incident side in both tensile and compressive stress configurations. FIG. 25 illustrates strength of laser cut (micro-machined) edges, compared to mechanically cut edges. More specifically, FIG. 25 shows the Weibull distribution probability plots of the measured bend strength. Under one set of conditions, both the tensile and compressive configurations of the laser incident side show similar strength distributions to the mechanically cut and sintered electrolyte. However, a second set of samples that experienced an increased vacuum force while micromachining exhibited a much higher strength when the laser incident side was in compression. These higher strength samples had a vacuum channel holding the electrolyte in position while cutting. The vacuum channel (see FIG. 8) was aligned on the electrolyte side opposite of the incident laser power, and the vacuum force was pulling the electrolyte away from the incident laser energy. One unexpected result is that the electrolyte sheet cut with the fs laser under these conditions can show higher strength than seen in any of the other mechanically cut or laser cut samples, greater than 2 GPa, 2.7 GPa, and even as high as 3 GPa, versus typical strength of approximately 1.0 to 1.5 GPa. The highest strength parts were cut with while a vacuum was applied on the electrolyte sheet 100 via vacuum channel(s) 165 during the cutting process, pulling the electrolyte sheet 100 down, away from the laser during cutting.

A general observation of the femtosecond laser micromachined samples is that debris around the micromachined area was significantly less, in comparison with the nano-second laser micromachined samples. The femtosecond laser machined parts exhibit a unique surface morphology that shows essentially complete ablation without substantial fracture and limited grain growth (e.g., grain size in 3YZ electrolyte was less than 2 µm, ad typically less than 1 µm). The unusually high strength of the electrolyte sheet edges is thought to be associated with this unique morphology. Electrolyte sheet with a laser micromachined edge surface exhibiting 100% ablation, or/and grain size of more than 0.2 microns but of less than 2 microns is preferred for strength optimization.

Examples 9a and 9b Surface Patterning

Figures 26A, 26B, 26C:
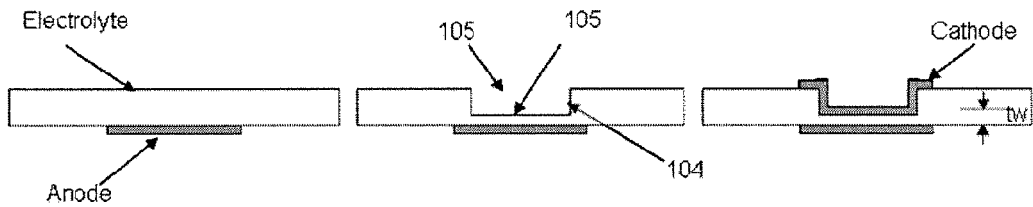
FIGS. 26a-26c illustrate schematically laser micromachining of the electrolyte surface.

Example 9a. This example demonstrates the use of laser ablation for surface patterning of electrolyte sheets. Another identified application of laser micromachining the electrolyte is for manipulating the zirconia surface to produce roughened, textured, or micro-windowed patterns. Laser micromachining partially through the electrolyte sheet 100 allows surface machining that may not be possible through molding or casting techniques. For example, molding or casting techniques require a minimum electrolyte thickness in the unfired electrolyte to survive releasing it from the Teflon carrier. In some applications, it is preferred that the sintered bare electrolyte have a minimum thickness to survive handling as a free standing film. For example, an electrolyte with a thickness of about 20 µm can be laser micromachined after electrode layers have been fabricated on it. FIGS. 26a-26c illustrate a 20 µm thick electrolyte substrate with a fired 5 µm thick anode layer fabricated on one side. As shown, laser micromachining is used to partially remove the electrolyte layer producing a window thickness $t_w$ (electrolyte sheet patterns 105) of less than 5 µm, which can not be generally produced in a free standing or self supporting electrolyte sheet. In this case, the existing anode layer provides the required mechanical strength to survive handling. A cathode layer is then fabricated on the opposite side to complete the fuel cell device. The micromachined features constitute a significant percentage of the area under the electrodes, preferably greater than about 25% and more preferably greater than about 40%. The patterns may have a relief (depth) of greater than 5 µm or preferably more than 30% and more preferably more than 50% of the electrolyte sheet thickness. The method of the present invention is especially applicable for use with electrolyte sheets with overall thicknesses <100 µm and preferably <30 µm, most preferably less than about 20 µm, although it can be utilized with much thinner electrolyte sheets, even as thin as 3 or 5 µm. The described method is also applicable to laser cutting, laser drilling, and surface machining of the electrolyte sheet after additional layers have been applied.

Figure 27A:
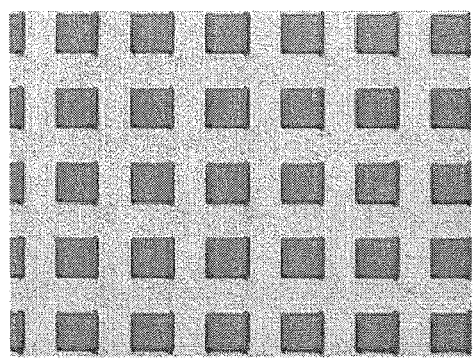
FIGS. 27a-27d are photographs of exemplary laser micromachined sintered electrolyte surfaces.
Figure 27B:
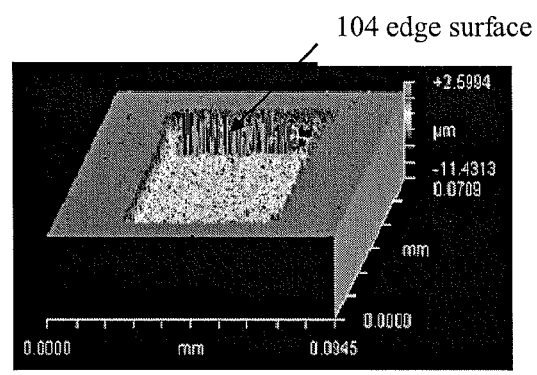
Figure 27C:
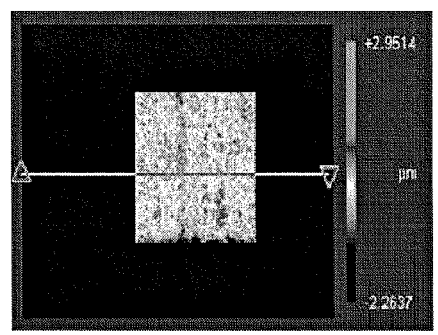
Figure 27D:
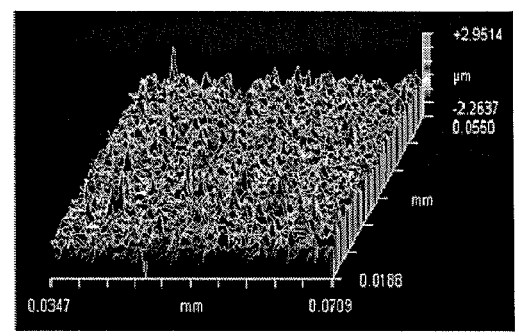

Example 9b. This example also demonstrates the use of laser ablation for surface patterning of electrolyte sheets. Laser micromachining the electrolyte surface with the fs laser system was used to create a 10×10 array pattern of 50 µm wide squares. Spacing between the squares was also approximately 50 µm. Each square was created by rastering the laser energy for a total of 10 line scans offset by 5 µm each. The focal length of the lens was 35 mm and the laser power was 4 mW. FIGS. 27a-27d show both optical microscope as well as optical interferometric data of the micromachined features. FIG. 27a shows a section of the 10×10 array pattern as seen with an optical microscope. The slight rounding and enlargement of two of the corners of each square is apparent. This is due to the laser persistence at these points during the start and stop of each raster cycle. The average depth of the squares is 4.0 µm+0.1 um, and the optical interferometer depth image is shown in FIG. 27b. FIGS. 27c and 27d show optical interferometer images at the bottom of each square feature over a 0.04 mm×0.04 mm area. As shown, the path of the laser rastering is observable. The average roughness values for these laser micromachined surfaces was 4.88 um±1.22 µm (peak-valley), 0.35 um±0.04 µm (rms), and 0.26 um±0.02 um (Ra). For comparison, the values for the un-machined electrolyte surface are 1.231 um±0.377 µm (peak-valley), 0.046 um±0.001 µm (rms), 0.034 um±0.001 µm (Ra).

The inventive method is applicable to fuel cell devices and specifically to the electrolyte supported multi-cell design and fabrication process. The method is especially applicable to manufacture of fuel cell devices that are based on multiple cells fabricated on a common electrolyte substrate and interconnected through conductive vias. Because, according to one aspect of the present invention, laser micromachining (e.g., hole punching and electrolyte trimming) is done after sintering, laser micromachining is particularly useful for processing of large devices with a dimension over 30 cm where processing of ceramic in the unfired state would require highly demanding shrinkage control. One advantage of the method of the present invention is the increase in device fabrication yield, throughput, and performance.

It will be apparent to those skilled in the art that variations and modifications can be made to the present invention without departing from the scope of the invention. Thus, it is intended that the present invention cover the modifications and variations of this invention provided they come within the scope of the appended claims and their equivalents.

The invention claimed is:

1. A method of micromachining an electrolyte sheet comprising:
   sintering the electrolyte sheet;
   supporting the sintered electrolyte sheet; and
   micromachining the sintered electrolyte sheet with a laser having a wavelength of less than 400 nm, a fluence of between 5 Joules/cm$^2$ and 200 Joules/cm$^2$, a repetition rate of between 30 Hz and 200 kHz and a pulse duration of between 1 ns and 100 ns.

2. The method of micromachining an electrolyte sheet according to claim 1, wherein said laser is a 355 nm nanosecond laser.

3. The method of micromachining an electrolyte sheet according to claim 2, wherein said laser has a repetition rate of at least 1 KHz, and cutting speed >50 mm/sec.

4. A method of making multiple fuel cell devices, wherein multiple fuel cell devices (i) are at least partially fabricated on a single sheet of electrolyte; and (ii) are laser cut, separating them from one another according to the micromachining method of claim 1.

5. The method of micromachining an electrolyte sheet according to claim 1, said method including cutting off by micromachining more than 1 mm of at least one side of the electrolyte sheet, so as to remove at least a portion of electrolyte sheet edge curl.

6. The method of micromachining an electrolyte sheet according to claim 1, wherein the micromachining is performed by ablation in conjunction with auto-cleaving.

7. The method of micromachining an electrolyte sheet according to claim 1, wherein said micromachining includes cutting holes or trimming perimeter of the electrolyte sheet trough its entire thickness.

8. The method of micromachining an electrolyte sheet according to claim 1, wherein said electrolyte sheet is a corrugated sheet and said micromachining method produces via holes in said electrolyte sheet.

9. The method of micromachining an electrolyte sheet according to claim 1, including a step of laser micromachining at least one additional layer situated on said electrolyte sheet.

10. The method of micromachining an electrolyte sheet according to claim 7, wherein said holes are produced with a lip and said lip is trimmed off with a laser to a height of less than 5 μm.

11. The method of micromachining an electrolyte sheet according to claim 1, wherein the electrolyte sheet comprises a body of no more than 45 μm thick.

12. The method of micromachining an electrolyte sheet according to claim 1, wherein the electrolyte sheet is zirconia based.

13. The method of micromachining an electrolyte sheet according to claim 1, wherein the wavelength of the laser is between 200 nm and 300 nm.

14. The method of micromachining an electrolyte sheet according to claim 1, wherein the repetition rate of the laser is between 30 kHz and 200 kHz.

15. The method of micromachining an electrolyte sheet according to claim 1, wherein the fluence of the laser is less than 26 Joules/cm$^2$.

16. The method of micromachining an electrolyte sheet according to claim 1, wherein micromachining the sintered electrolyte sheet with a laser includes scanning a laser beam across a surface of the electrolyte sheet.

17. The method of claim 1, wherein the sintered electrolyte sheet is micromachined by drilling via holes through a thickness of the sintered electrolyte sheet with the laser using a multi-pass laser drilling technique at a wavelength of less than 400 nm, a fluence of between 5 Joules/cm$^2$ and 200 Joules/cm$^2$, a repetition rate of between 30 Hz and 200 kHz, and a pulse duration of between 1 ns and 100 ns.

18. The method of claim 17, wherein the sintered electrolyte sheet is micromachined by drilling via holes through a thickness of the sintered electrolyte sheet with the laser using a multi-pass laser drilling technique at a wavelength of less than 400 nm, a fluence of between 5 Joules/cm$^2$ and 200 Joules/cm$^2$, a repetition rate of between 30 Hz and 200 kHz, a pulse duration of between 1 ns and 100 ns, a laser speed >30 mm/sec, and a pulse energy <60 μJ.

19. The method of claim 17, wherein the multi-pass laser drilling technique is a trepanning drilling technique.

20. The method of claim 17, wherein the multi-pass laser drilling technique is a helical drilling technique.

21. The method of claim 1, wherein the sintered electrolyte sheet is micromachined by scoring and fracturing the sintered electrolyte sheet with the laser at a wavelength of less than 400 nm, a fluence of between 5 Joules/cm$^2$ and 200 Joules/cm$^2$, a repetition rate of between 30 Hz and 200 kHz, and a pulse duration of between 1 ns and 100 ns, to form an edge surface that exhibits a combination of fracture and ablation, with more than 50% fracture and less than 50% ablation.

22. The method of claim 21, wherein the sintered electrolyte sheet is micromachined by scoring and fracturing the sintered electrolyte sheet with the laser at a cutting speed >30 mm/sec.

23. The method claim 1, wherein the sintered electrolyte sheet is micromachined by ablating the electrolyte sheet at a wavelength of less than 400 nm, a fluence of between 5 Joules/cm$^2$ and 200 Joules/cm$^2$, a repetition rate of between 30 Hz and 200 kHz, and a pulse duration of between 1 ns and 100 ns to form an ablated edge surface having a grain size of less than about 2 μm.

* * * * *